United States Patent
Mannaly

(10) Patent No.: US 11,237,744 B2
(45) Date of Patent: Feb. 1, 2022

(54) METHOD AND SYSTEM FOR CONFIGURING A WRITE AMPLIFICATION FACTOR OF A STORAGE ENGINE BASED ON A COMPACTION VALUE ASSOCIATED WITH A DATA FILE

(71) Applicant: Oath Inc., New York, NY (US)

(72) Inventor: Arjun Mannaly, San Jose, CA (US)

(73) Assignee: VERIZON MEDIA INC., New York, NY (US)

( * ) Notice: Subject to any disclaimer, the term of this patent is extended or adjusted under 35 U.S.C. 154(b) by 35 days.

(21) Appl. No.: 16/235,319

(22) Filed: Dec. 28, 2018

(65) Prior Publication Data
US 2020/0210087 A1  Jul. 2, 2020

(51) Int. Cl.
*G06F 3/06* (2006.01)
*G06F 16/22* (2019.01)
*G06F 16/23* (2019.01)

(52) U.S. Cl.
CPC .......... *G06F 3/0643* (2013.01); *G06F 3/0604* (2013.01); *G06F 3/0608* (2013.01); *G06F 3/0661* (2013.01); *G06F 3/0673* (2013.01); *G06F 16/2228* (2019.01); *G06F 16/2379* (2019.01)

(58) Field of Classification Search
CPC .... G06F 3/0643; G06F 3/0604; G06F 3/0608; G06F 3/0661; G06F 3/0673; G06F 16/2379; G06F 16/2228
See application file for complete search history.

(56) References Cited

U.S. PATENT DOCUMENTS

| | | | | |
|---|---|---|---|---|
| 5,325,290 A | * | 6/1994 | Cauffman | G06Q 30/0284 379/114.01 |
| 5,761,655 A | * | 6/1998 | Hoffman | G06F 16/58 |
| 7,669,003 B2 | * | 2/2010 | Sinclair | G06F 12/0246 711/103 |

(Continued)

OTHER PUBLICATIONS

Mannaly, Arjun, "Introducing HaloDB, a fast, embedded key-value storage engine written in Java," Sep. 19, 2018, downloaded from https://developer.yahoo.com/blogs/178262468576/on Mar. 23, 2020, 4 pages.*

HaloDB/docs/WhyHaloDB.md, "HaloDB at Yahoo," May 9, 2019, downloaded from https://github.com/yahoo/HaloDB/blob/master/docs/WhyHaloDB.md , on Mar. 23, 2020, 5 pages.*

(Continued)

*Primary Examiner* — Tuan V Thai
(74) *Attorney, Agent, or Firm* — Venable LLP

(57) ABSTRACT

A method, system and non-transitory computer-readable medium for operating a storage engine are disclosed. With respect to a data file, a compaction value is obtained and a counter is retrieved. The compaction value indicates the minimum number of valid records in the data file for a clean-up process to be initiated. In response to the counter satisfying a first criterion, a determination is made, for each record in the data file, as to whether the record is written to another data file based on the record satisfying a second criterion. A write amplification factor of the storage engine is determined based on the compaction value. The counter indicates the number of records in the data file that are invalid. The write amplification factor and a space amplification factor are configurable; the storage engine may be tuned based on workloads, desired write throughput, desired storage utilization, and bandwidth of a storage device.

20 Claims, 19 Drawing Sheets

(56) References Cited

U.S. PATENT DOCUMENTS

| | | | | |
|---|---|---|---|---|
| 8,856,475 | B1* | 10/2014 | Meir | G06F 12/0253 |
| | | | | 711/165 |
| 8,990,484 | B2* | 3/2015 | Kang | G06F 12/0246 |
| | | | | 711/103 |
| 9,584,509 | B2* | 2/2017 | Hamburg | G06F 21/6209 |
| 2011/0022778 | A1* | 1/2011 | Schibilla | G06F 12/0246 |
| | | | | 711/103 |
| 2011/0191566 | A1* | 8/2011 | Takamiya | G06F 12/10 |
| | | | | 711/206 |
| 2011/0283049 | A1* | 11/2011 | Kang | G06F 12/0246 |
| | | | | 711/103 |
| 2014/0032817 | A1* | 1/2014 | Bux | G06F 12/0246 |
| | | | | 711/103 |
| 2015/0120684 | A1* | 4/2015 | Bawaskar | G06F 16/137 |
| | | | | 707/693 |
| 2016/0350007 | A1* | 12/2016 | Choi | G06F 12/023 |
| 2017/0031959 | A1* | 2/2017 | Zayas | G06F 16/1727 |
| 2017/0357577 | A1* | 12/2017 | Lee | G06F 12/0269 |
| 2019/0236156 | A1* | 8/2019 | Fanghaenel | G06F 12/0891 |
| 2019/0258587 | A1* | 8/2019 | Zhou | G06F 3/0679 |

OTHER PUBLICATIONS

HaloDB/docs/benchmarks.md, "Benchmarks," May 9, 2019, downloaded from https://github.com/yahoo/HaloDB/blob/master/docs/benchmarks.md, on Mar. 23, 2020, 6 pages.*

HaloDB/README.md, "HaloDB," Jun. 4, 2019, downloaded from https://github.com/yahoo/HaloDB/blob/master/README.md, on Mar. 23, 2020, 8 pages.*

Dong et al, "Optimizing Space Amplification," 8th Biennial Conference on Innovative Data Systems Research (CIDR '17), Jan. 8-11, 2017, downloaded from https://pdfs.semanticscholar.org/9b90/568faad1fd394737b79503571b7f5f0b2f4b.pdf on Mar. 26, 2020, 9 pages.*

Sheehy et al, "Bitcask," Apr. 27, 2010, downloaded from https://riak.com/assets/bitcask-intro.pdf on Mar. 26, 2020, 6 pages.*

"Read, write & space amplification," Small Datum, Nov. 23, 2015, downloaded from http://smalldatum.blogspot.com/2015/11/read-write-space-amplification-pick-2_23.html on Mar. 26, 2020, 2 pages.*

Baravani, "Database storage engines under the hood," May 20, 2018, downloaded from https://medium.com/@shashankbaravani/database-storage-engines-under-the-hood-705418dc0e35 on Mar. 26, 2020, 9 pages (last page unreadable as printed).*

* cited by examiner

METHOD AND SYSTEM FOR CONFIGURING A WRITE AMPLIFICATION FACTOR OF A STORAGE ENGINE BASED ON A COMPACTION VALUE ASSOCIATED WITH A DATA FILE

BACKGROUND

1. Technical Field

The present disclosure generally relates to a data storage engine.

2. Technical Background

Over the last decade, processor speeds have increased dramatically while storage disk access times have only improved slowly. This trend is likely to continue in the future and cause more and more applications to become disk bound. For instance, multiple advertisement platforms rely on an advertisement server for storing user profile data. The advertisement server stores data such as demographic data, click and impression data, location data etc., that helps advertisement platforms serve relevant advertisements to users. Typically, advertisement platforms query the advertisement server in real-time for each advertisement request. The advertisement requests have stringent service level agreements, which in turn imposes a requirement on the advertisement server to have fast processing capabilities.

The advertisement server's workload is disk input/output bound, and thus a crucial component that dictates the performance of the server is a fast storage engine. Typical storage engines are designed to handle a heavy read workload. However, such storage engines have poor throughput with respect to write operations, and thus widescale use of such storage engines is limited.

Furthermore, many publicly available storage engines use a variation of hash table, B-trees, or a log structured merge tree as a data structure to organize and store data. Such data structures are not suitable for a mixed workload (i.e. read and write operations). For example, B-tree based storage engines have a high read amplification factor (greater than one). Hash table as well as B-tree based storage engines are not suitable for a heavy write workload as they need to perform random write operations. Although modern solid-state drives have narrowed the gap between sequential and random write performance, sequential writes still have a higher throughput, primarily due to the reduced internal garbage data collection. Log-structured merge trees are also unsuitable as they incur a high write amplification factor. Moreover, parameters such as the write amplification factor, space amplification factor, etc., that determine performance of the storage engines are non-configurable.

Additionally, other issues such as storage engine crash recovery and efficient maintenance of user records prohibit the widespread usage of the typical storage engines. For instance, it may take several hours to repair a corrupted database partition or iterate over and update/delete user records in typical storage engines. Moreover, the typical storage engines do not expose enough operational metrics or logs, thereby making the debugging process more challenging.

Accordingly, there is a requirement for a storage engine that addresses the above stated issues.

SUMMARY

The present disclosure relates to methods, systems, and a non-transitory computer readable medium storing executable program data for a data storage engine.

One aspect of the present disclosure provides for a method, implemented on a machine having at least one processor, storage, and a communication platform capable of connecting to a network for operating a storage engine. The method includes obtaining a compaction value associated with a data file, and retrieving a counter corresponding to the data file. The method also includes determining, for each record included in the data file, and in response to the counter satisfying a first criterion, whether the record is to be written to another data file based on the record satisfying a second criterion, wherein a write amplification factor of the storage engine is determined based on the obtained compaction value.

In another aspect of the present disclosure, there is provided a system for operating a storage engine. The system includes a compaction unit configured for obtaining a compaction value associated with a data file, and retrieving a counter corresponding to the data file. Further, the compaction unit is configured for determining for each record included in the data file, and in response to the counter satisfying a first criterion, whether the record is to be written to another data file based on the record satisfying a second criterion, wherein a write amplification factor of the storage engine is determined based on the obtained compaction value.

Other aspects relate to software for implementing the present invention. A software product, in accordance with the present disclosure, includes at least one non-transitory machine-readable medium storing executable program data and information carried by the medium. The information stored on or carried by the medium may be executable program code data, parameters associated with the executable program code, and/or information related to a user, a request, content, or other additional information.

In one example, there is provided, a non-transitory computer readable medium including computer executable instructions, wherein the instructions, when executed by a processor of a computer, cause the processor of the computer to perform a method for operating a storage engine. The method includes obtaining a compaction value associated with a data file, and retrieving a counter corresponding to the data file. The method further includes determining, for each record included in the data file, and in response to the counter satisfying a first criterion, whether the record is to be written to another data file based on the record satisfying a second criterion, wherein a write amplification factor of the storage engine is determined based on the obtained compaction value.

Additional advantages and novel features will be set forth in part in the description which follows, and in part will become apparent to those of ordinary skill in the art upon examination of the following and the accompanying drawings or may be learned by production or operation of the examples. The advantages of the present invention may be realized and attained by practice or use of various aspects of the methodologies, instrumentalities and combinations set forth in the detailed examples discussed below.

BRIEF DESCRIPTION OF THE DRAWINGS

The methods, systems and/or non-transitory computer readable medium described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
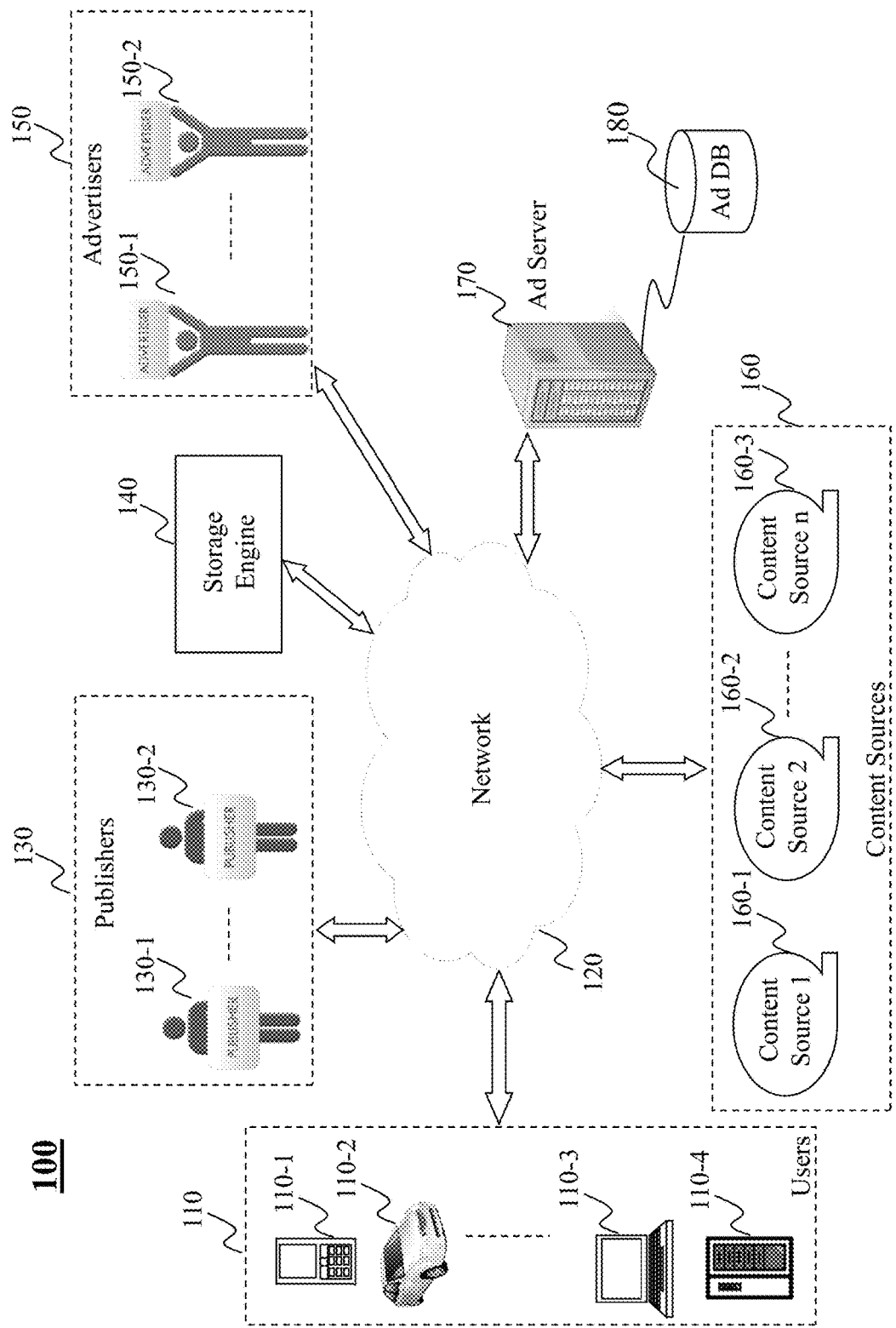
FIG. 1 is a high-level depiction of an exemplary networked environment in which a storage engine operates as an independent service on a network, according to an embodiment of the present disclosure.

In the following detailed description, numerous specific details are set forth by way of examples in order to provide a thorough understanding of the relevant teachings. However, it should be apparent to those of ordinary skill in the art that the invention may be practiced without such details. In other instances, well known methods, procedures, components, and/or circuitry have been described at a relatively high-level, without detail, in order to avoid unnecessarily obscuring aspects of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of software or a form of other than software per se, e.g., any combination of hardware, software and firmware. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to include A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a high-level depiction of an exemplary networked environment in which a storage engine operates as an independent service on a network, according to an embodiment of the present disclosure. The exemplary networked environment 100 includes users 110, a network 120, publishers 130, a storage engine 140, advertisers 150, content sources 160, an ad server 170, and an ad database (DB) 180. The network 120 in networked environment 100 may be a single network or a combination of different networks. For example, a network may be a local area network (LAN), a wide area network (WAN), a public network, a private network, a proprietary network, a Public Telephone Switched Network (PSTN), the Internet, a wireless network, or a virtual network, or any combination thereof. In one embodiment, the network 120 may be an online advertising network or an ad network, which connects advertisers 150 to publishers 130 or websites/mobile applications that want to host advertisements. A key function of an ad network is aggregation of ad-space supply from publishers and matching it with advertiser demand. An ad network may be a television ad network, a print ad network, an online (Internet) ad network, or a mobile ad network.

Users 110 may be of different types such as users connected to the network via desktop connections (110-4), users connecting to the network via wireless connections such as through a laptop (110-3), a handheld mobile device (110-1), or a built-in device in a motor vehicle (110-2). In one embodiment, user(s) 110 may be connected to the network and able to access and interact with online content (provided by the publishers) through wireless technologies and related operating systems implemented within user-wearable devices (e.g., glasses, wrist watch, etc.). A user, e.g., the user 110-1, may send a request for online content to one of the publishers, e.g., 130-1, via the network 120 and receive content through the network 120.

Publishers 130 may correspond to an entity, whether an individual, a firm, or an organization, having a publishing business, such as a television station, a newspaper issuer, a web page host, an online service provider, or a game server. For example, in connection to an online or mobile ad network, publishers 130-1 . . . 130-2 can be an organization such as USPTO.gov, a content provider such as CNN.com and Yahoo.com, or a content-feed source such as a tweeter or blogs. In one embodiment, publishers 130 include entities that develop, support and/or provide online content via mobile applications (e.g., installed on smartphones, tablet devices, etc.).

Referring to the above example, the content sent to user 110-1 may be generated by the publisher 130-1 based on the content sources 160. A content source may correspond to an entity where the content was originally generated and/or stored. For example, a novel may be originally printed in a magazine, but then posted online at a web site controlled by a publisher. The content sources 160 in the exemplary networked environment 100 include multiple content sources 160-1, 160-2 . . . 160-3.

An advertiser, e.g. 150-1, may correspond to an entity, whether an individual, a firm, or an organization, doing or planning to do (or otherwise involved in) advertising business. As such, an advertiser 150-1 may be an entity that provides product(s) and/or service(s), and itself handles the advertising process for its own product(s) and/or service(s) at a platform (e.g., websites, mobile applications, etc.) provided by a publisher. For example, advertisers 150-1 . . . 150-2 may include companies like General Motors, Best Buy, or Disney. In some other cases, however, an advertiser 150-1 may be an entity that only handles the advertising process for product(s) and/or service(s) provided by another entity.

When content is sent to the user 110-1, one or more advertising opportunities may be available for one or more advertisements to be presented with the content to the user 110-1, on a same web page, via the same application, or in a same user session. For an available advertising opportunity, a request may be sent out to advertisers to solicit bids with respect to the advertising opportunity. The request can be sent out by an ad server 170 that manages the publisher 130-1. The ad server here serves as a supply side platform (SSP) for selling one or more advertisement opportunities by soliciting bids from one or more demand side platforms (DSP) and selecting a winning bid among the bids received from the DSPs. The bid request may be sent out to one or more DSPs.

Advertisers 150 typically target the most receptive audiences with certain traits, based on the product or person the advertiser is promoting. These traits can either be demographic which are focused on race, economic status, sex, age, the level of education, income level and employment or they can be psychographic focused which are based on the consumer's values, personality, attitudes, opinions, lifestyles and interests. They can also be behavioral variables, such as browser history, purchase history, and other recent activity. Targeted advertising is focused on certain traits and the consumers who are likely to have a strong preference will receive the message instead of those who have no interest and whose preferences do not match a product's attribute. As such, the advertisers 150 can serve advertisements stored in an ad database 180 to the most relevant audience.

By one embodiment of the present disclosure, each user 110 of the system 100 is associated with a user record. Each user record may in turn include an user identifier (ID) and information related to the user, e.g., purchases made by the user, user's click activity, user's dwell time on content provided to the user and the like. Such user records are stored in the storage engine 140. Advertisers 150 (and/or publishers 130) typically have targeting criteria (i.e., a set of rules) which enables them to target the most relevant audiences and in turn maximize their return on investments. Moreover, advertisers and/or publishers have stringent service level agreements (SLAs) i.e., SLAs have hard time-constraints. This poses a requirement for the advertisers and/or publishers to be able to gain quick access (and process) user records stored in the storage engine 140. In other words, the performance of system 100 is dependent on having a fast storage engine i.e., a storage engine that has high read and write throughputs. In what follows, there is provided a detailed description of a fast, embedded key-value storage engine 140 that accomplishes the above stated features. Further, it must be appreciated that although the storage engine 140 as described above is in the realm of an advertising setting, it is equally applicable in other applications that require fast data access. Additionally, it must be appreciated that the operations of the storage engine as described herein is applicable to any type of data.

Figure 2:
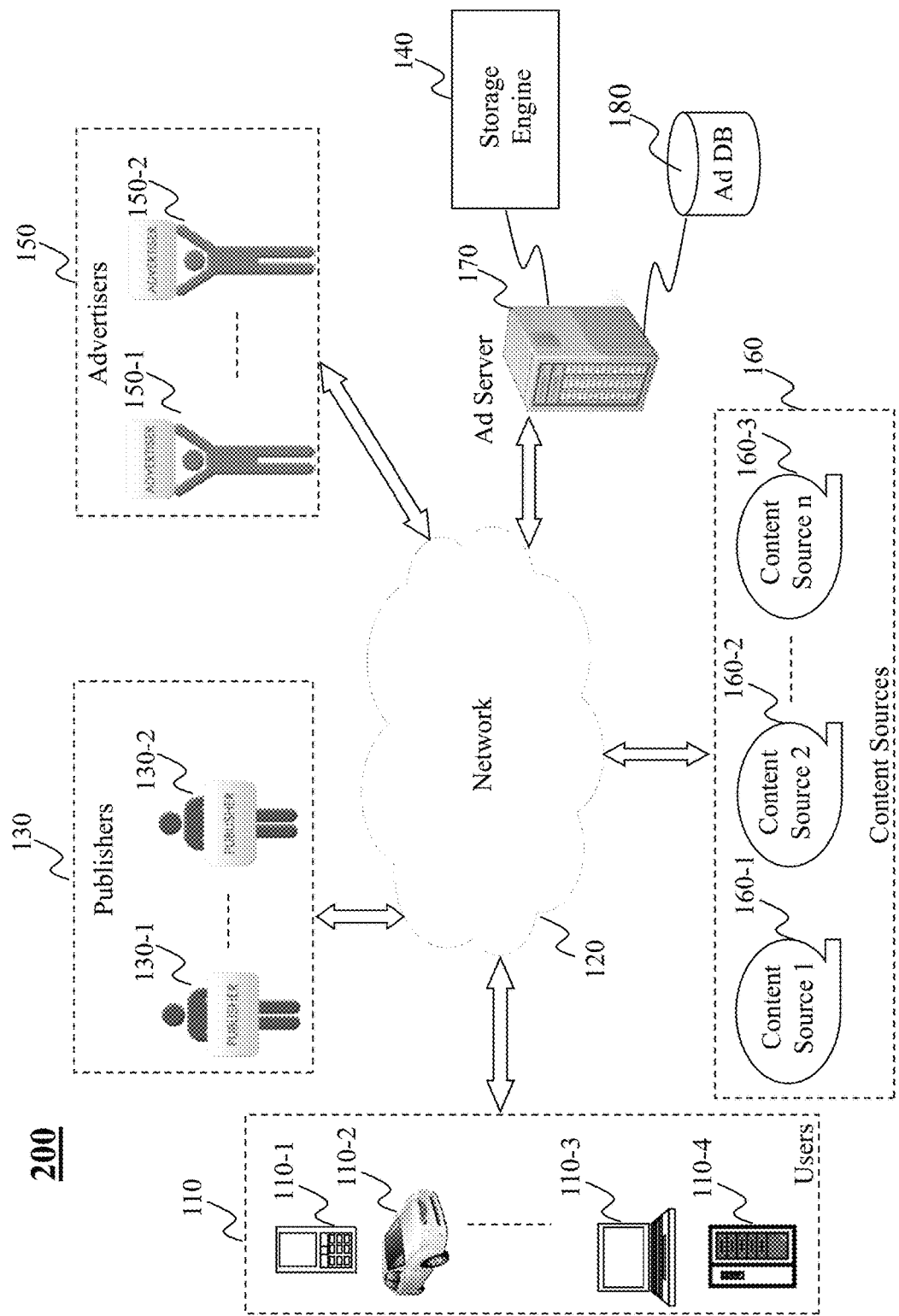
FIG. 2 is a high-level depiction of another exemplary networked environment in which a storage engine operates as a backend service engine of an advertisement server, according to an embodiment of the present disclosure.

In FIG. 2, an alternative configuration of a networked environment 200 is provided, in which a storage engine 140 is connected to an ad server 170 as its backend service engine. That is, in this embodiment, the storage engine 140 is a special module in the backend of an advertisement server 170. When there are multiple advertisement servers (not shown), each may have its own backend module for serving various advertiser requirements.

Figure 3:
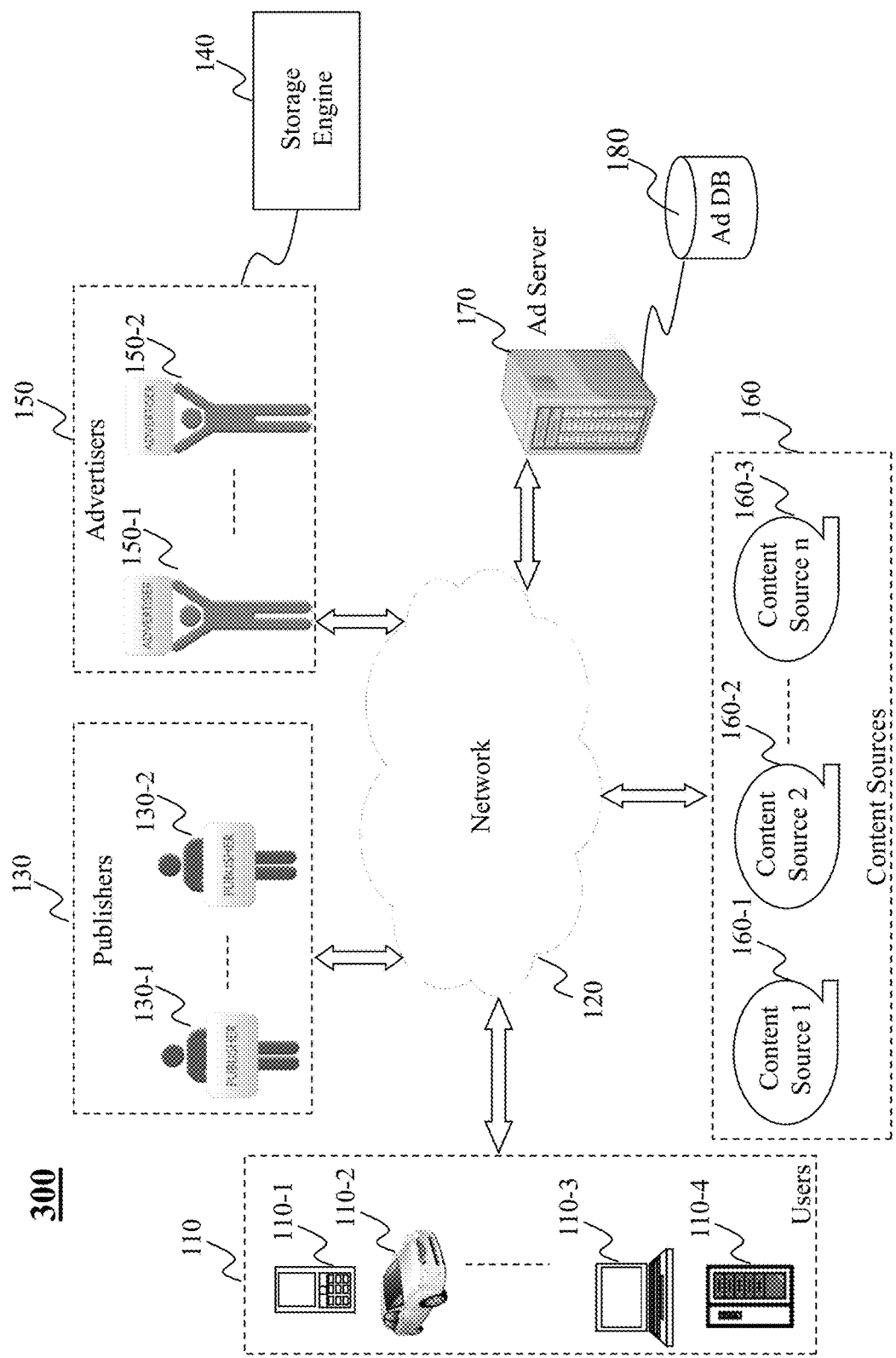
FIG. 3 is a high-level depiction of a different exemplary networked environment in which a storage engine operates as a backend service engine of an advertiser, according to an embodiment of the present disclosure.

In FIG. 3, an alternative configuration of a networked environment 300 is provided, in which a storage engine 140 is connected to an advertiser 150 as its backend service engine. That is, in this embodiment, the storage engine 140 is a special module in the backend of the advertiser 150. It must be appreciated that multiple advertisers may each have their own backend module (i.e., the storage engine) for providing quick and seamless access to data stored therein.

Figure 4:
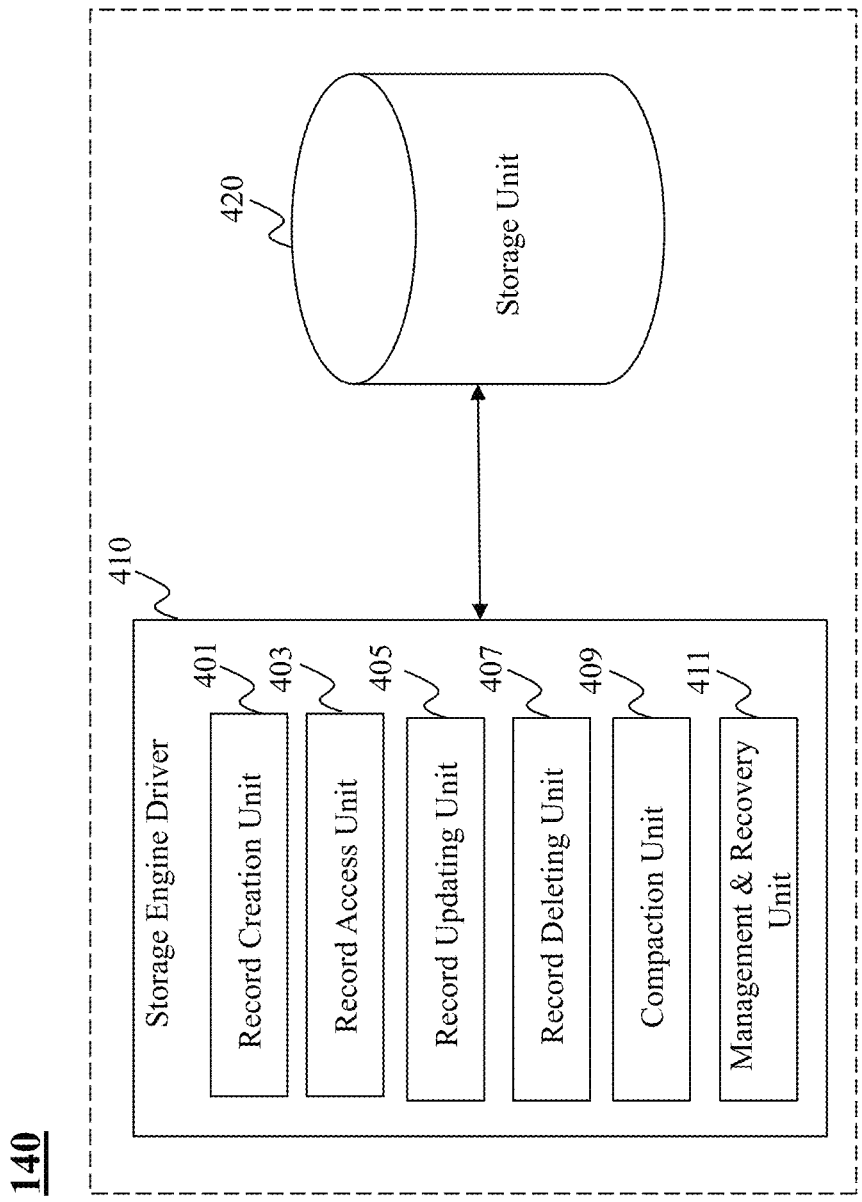
FIG. 4 depicts an exemplary schematic of a storage engine, according to an embodiment of the present disclosure.

Turning now to FIG. 4, there is depicted an exemplary schematic of a storage engine 140, according to an embodiment of the present disclosure. The storage engine 140 according to the present disclosure includes a storage engine driver 410 and a storage unit 420. The storage engine driver 410 includes the following components: a record creation unit 401, a record access unit 403, a record updating unit 405, a record deleting unit 407, a compaction unit 409, and a management and recovery unit 411. In what follows, there is provided a detailed description of the operation(s) of each of the processing units included in the storage engine driver 410, as well as a description of the architecture of the storage unit 420.

Figure 5:
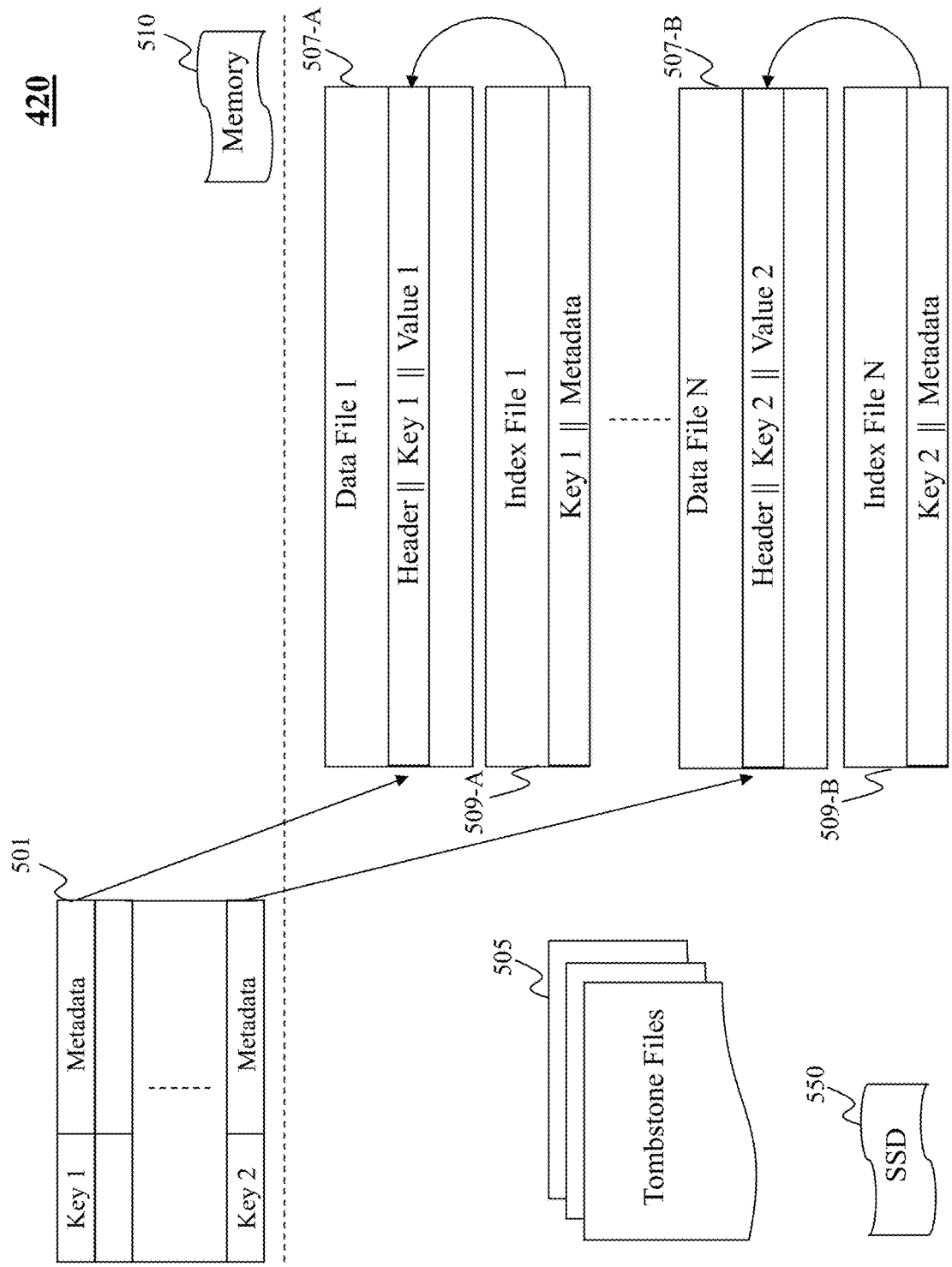
FIG. 5 is an exemplary schematic depicting design of a storage unit included in a storage engine, according to an embodiment of the present disclosure.

FIG. 5 is an exemplary schematic depicting an architecture of a storage unit 420 included in a storage engine 140, according to an embodiment of the present disclosure. The storage unit 420 includes a memory portion 510 (e.g., random access memory) and a disk portion 550 (e.g. solid-state drive (SSD)). By one embodiment of the present disclosure, the storage unit 420 includes an in-memory table 501 stored in the memory 510 and append only log files stored in the disk 550. Specifically, the files stored in the disk 550 include data files 507-A . . . 507B, etc., index files 509-A . . . 509B etc., and tombstone files 505. Each data file e.g., 507-A is associated with a corresponding index file i.e., 509-A. The tombstone files 505, which are separate from the data files are configured to store information pertaining to a deleted user record. Details regarding the deletion of a user record are described later.

According to one embodiment of the present disclosure, the in-memory table 501 that is included in the storage unit 420 may be an off-heap concurrent hash table. The in-memory table 501 maps each key to some metadata, which includes a reference to a specific data file and an offset (within the data file) where the associated user record (i.e., user record associated with the key) is stored. To lookup the record associated with a key, the corresponding metadata is first read from the in-memory table 501 to identify the data file that contains the most recent version of that key, and thereafter the value (i.e. content of the record) may be obtained from the identified data file. It must be appreciated that the size of the in-memory table 501, depending on the number of keys, can be quite large. Hence, according to one embodiment of the present disclosure, the in-memory table 501 may be stored for instance in native memory (i.e. outside a Java® heap) for performance reasons.

As shown in FIG. 5, key-value data is stored in the persistent layer (i.e. portion 550) in append only data files 507-A, 507-B, etc. According to one embodiment, each data file has a configurable size. Once data stored in a data file reaches the configured size, the data file is rolled over i.e., new data is written into a subsequent data file. Thus, all write operations (including user record updates), are sequential in nature. Accordingly, it must be noted that as user records are never over-written, a mechanism is required to clear older versions of data to make space. According to one embodiment of the present disclosure, this is performed by the compaction unit 409 included in the storage engine driver 140. Specifically, the compaction unit 409 copies fresh data to a new file and then deletes the old file. Each data file is compacted only when a criterion associated with the data file is satisfied e.g., percentage of stale data in the data file reaches a predetermined threshold value. Details regarding the compaction process are described next.

Further, as stated previously, each data file 507-A, 507-B, . . . etc., has a corresponding index file 509-A, 509B, . . . etc., associated with it. The index files are also stored in the persistent layer (i.e. portion 550 of the storage unit). The index file associated with a data file stores all the keys related to the data file and some metadata for each key. The metadata includes for instance, an offset of the key-value record in the data file (i.e., a location in the data file where the user record is stored). It must be appreciated that index files are much smaller in size than the data files and hence obviate the need to scan the data file during compaction. Moreover, the index files provided for a faster construction of the in-memory table at startup time.

Figure 6A:
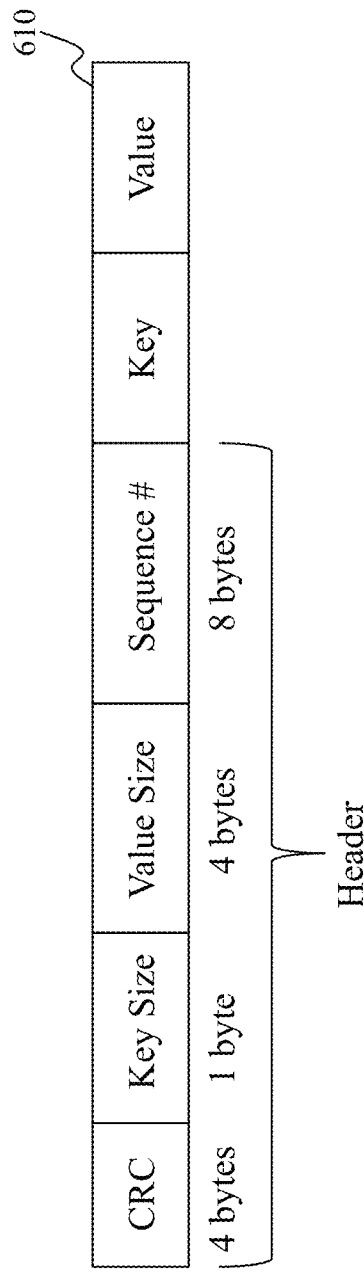
FIGS. 6A-6D depict exemplary record (data file record, index file record, tombstone record, and key-metadata) formats utilized in a storage engine, according to several embodiments of the present disclosure.

FIGS. 6A-6D depict exemplary record formats utilized in a storage engine, according to several embodiments of the present disclosure. FIG. 6A depicts a data file record format 610. According to one embodiment, the record format 610 includes a header portion containing a cyclic redundancy check (CRC) field of length 4 bytes, a key-size field of length 1 byte, a value size field of length 4 bytes, and a sequence number field of length 8 bytes. Thus, the length of the header portion is 17 bytes. Further, the record format 610 includes a key and value (i.e., content) fields, respectively.

Figure 6B:
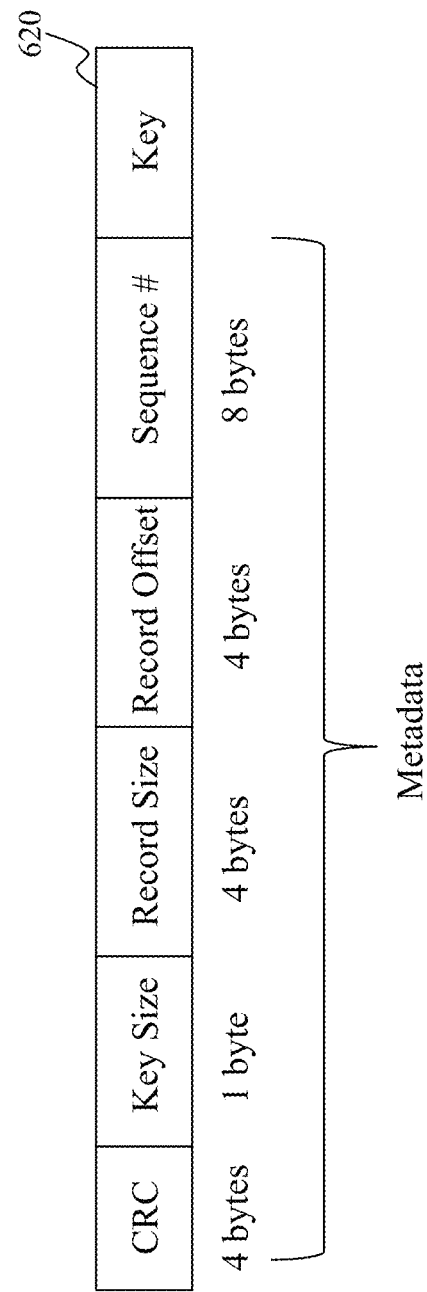

FIG. 6B depicts an index file record format 620. According to one embodiment, the record format 620 includes a metadata portion and a key portion. The metadata portion includes a CRC field of length 4 bytes, a key-size field of length 1 byte, a record size field of length 4 bytes, a record offset field of length 4 bytes, and a sequence number field of length 8 bytes. Thus, the length of the metadata portion of the index file record format is 21 bytes. Additionally, the key included in the index file record format 620 may have a length of 8 bytes. Referring to FIGS. 6A and 6B, it must be appreciated that each record requires a 17-byte header in the data file and 21 bytes of metadata in the index file. Thus, a record that has an 8-byte key writes an additional 46 bytes of data (i.e., 17 bytes header, 21 bytes metadata, and 8-byte key) to the disk, which negligibly affects the write amplification of the storage unit.

Figure 6C:
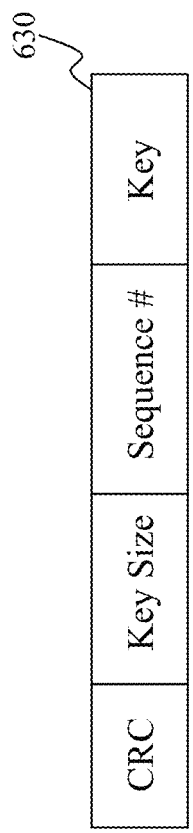

Turning to FIG. 6C, there is depicted a tombstone record format 630. As stated previously with reference to FIG. 5, the tombstone files 505 are maintained in the disk portion 550 of the storage unit 420. The tombstone record format 630 includes a CRC field of length 4 bytes, a key size field of length 1 byte, a sequence number field of length 8 bytes and a key field. It must be appreciated that maintaining the tombstone records (in the tombstone files 505) separate from the data files obviates the requirement to move the tombstone records during compaction process and thus increases efficiency (e.g., lowering write amplification) of the storage unit of the present disclosure.

Figure 6D:
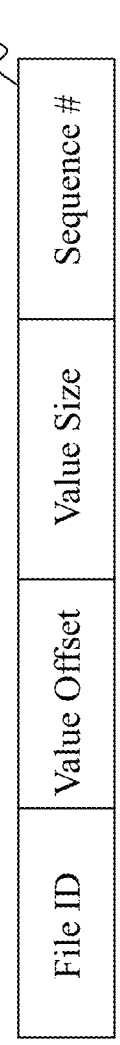

FIG. 6D depicts a format of key-metadata 640 that is stored in the in-memory table of the storage unit. As stated previously, the in-memory table may be a hash table mapping a record key to metadata. According to one embodiment of the present disclosure, the format 640 includes a file identifier (ID) field of length 4 bytes, a value offset field of length 4 bytes, a value size field of length 4 bytes, and a sequence number field of length 8 bytes. Note that the value offset field indicates a location in the data file where content is stored, and the value size field indicates size of content that is stored at the location.

Figure 7:
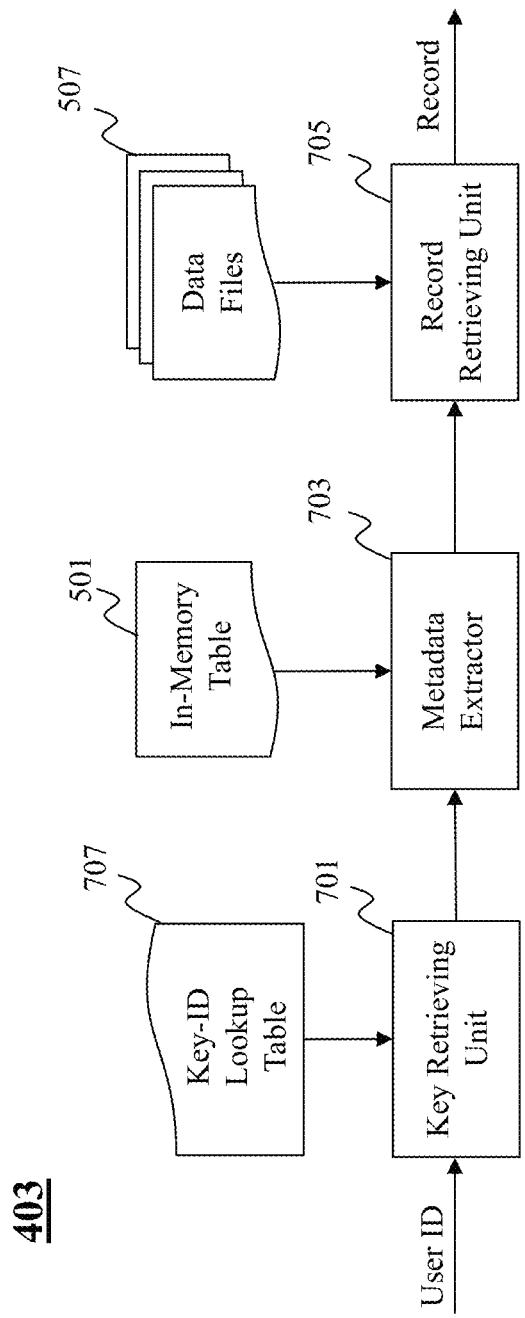
FIG. 7 depicts an exemplary system diagram of a record access unit, according to an embodiment of the present disclosure.

Turning now to FIG. 7, there is depicted an exemplary system diagram of a record access unit 403, according to an embodiment of the present disclosure. The record access unit 403 is included in the storage engine driver 410 of the storage engine and configured to access a user record stored in a data file. The record access unit 403 includes a key retrieving unit 701, a metadata extractor 703, and a record retrieving unit 705.

The key retrieving unit 701 receives as input an identifier (ID) of a user whose record is to be accessed. Upon receiving the ID, the key retrieving unit 701 utilizes a key-ID look up table 702 to obtain a key associated with the user ID. The key-ID lookup table is mapping of user IDs to their corresponding keys.

The key-retrieving unit 701 transmits the obtained key to the metadata extractor 703. The metadata extractor 703 extracts metadata associated with the key from the in-memory table 501. For example, referring to FIG. 6D, the metadata extractor 703 extracts information such as a file ID, value offset (i.e. location in the file where the desired content is stored) etc. The extracted metadata is transmitted to the record retrieving unit 705, which utilizes the metadata to retrieve the desired user record from the data file 507. The retrieved content may be provided to a requestor (i.e., a user who issued the record access instruction).

Figure 8:
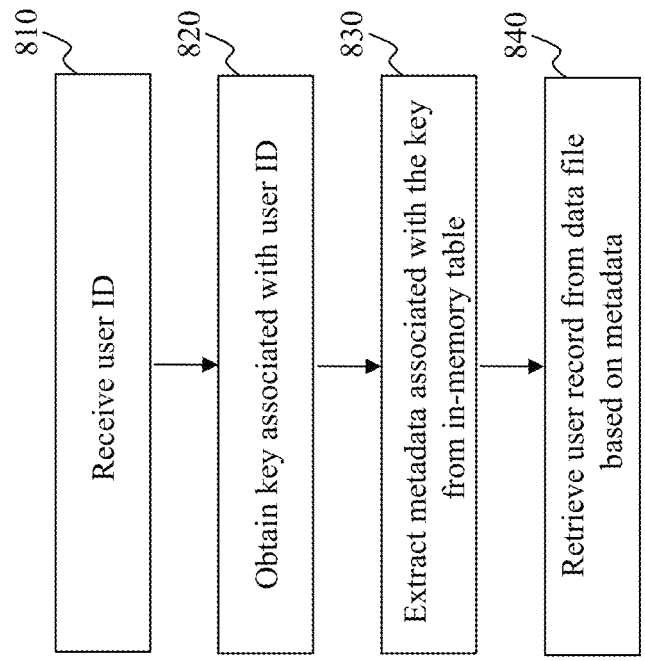
FIG. 8 is a flowchart of an exemplary process performed by a record access unit, according to an embodiment of the present disclosure.

FIG. 8 is a flowchart of an exemplary process performed by a record access unit, according to an embodiment of the present disclosure. The process commences in step 810, wherein the record access unit receives a user ID as input. In step 820, the record access unit obtains a key associated with the user ID. The process then moves to step 830, wherein the record access unit extracts metadata associated with the obtained key from the in-memory table. Upon extracting the metadata, the record access unit utilizes the extracted metadata to retrieve a specific data file and retrieve the user record from a specific location within the data file (step 840).

Figure 9:
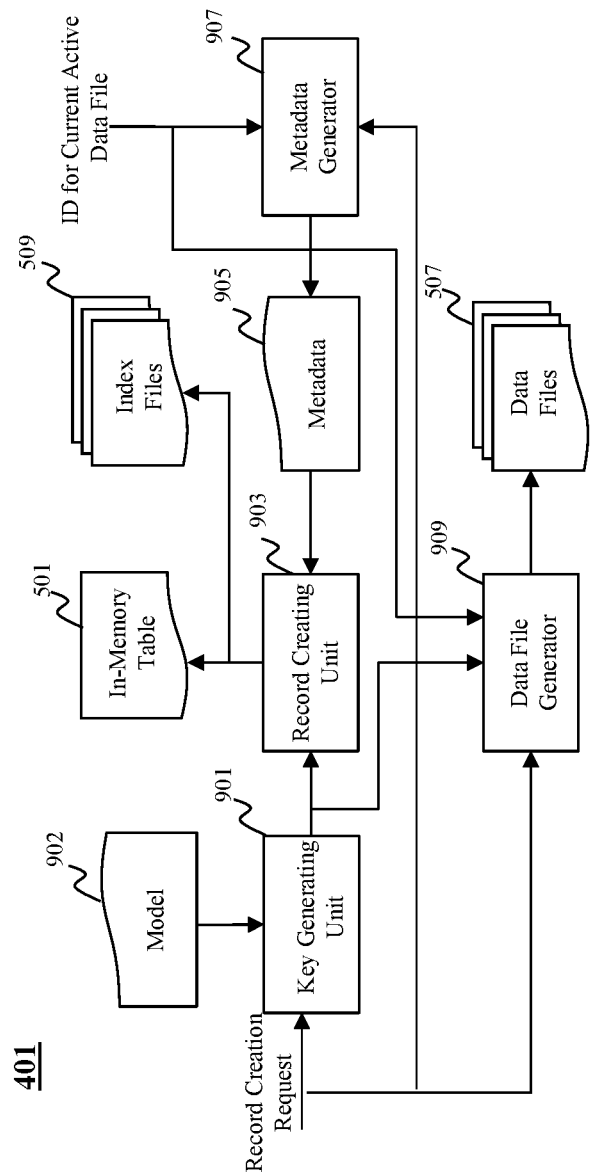
FIG. 9 depicts an exemplary system diagram of a record creation unit, according to an embodiment of the present disclosure.

FIG. 9 depicts an exemplary system diagram of a record creation unit 401, according to an embodiment of the present disclosure. The record creation unit 401 includes a key generating unit 901, a record creating unit 903, a metadata generator 907, and a data file generator 909. The key generating unit 901 receives a request for creating a new record and generates a key to be associated with the request in accordance with a model 902. The generated key is sent to the record creating unit 903 and the data file generator 909.

The metadata generator 907 receives an identifier corresponding to a current active data file (i.e., the data file in which the newly created record is to be stored) and content associated with the request. The metadata generator 907 generates metadata 905 that is required to be stored in the in-memory table and the index files. The generated metadata may include for example, a file ID, a value size (i.e., a size of the content in the record), a value offset (i.e., a location in the data file where the record is to be saved), etc.

The records creating unit 903 receives the generated metadata 905 and the generated key associated with the request. Based on the key and the metadata, the record creating unit 903 creates an entry in the in-memory table 501 and the index file 509. The data file generator 909 receives the content associated with the new record to be created, the identifier of the current active data file, and the generated key. Based on the generated key and the content associated with the request, the data file generator 909 creates a corresponding entry for the new record in the current active data file.

Figure 10:
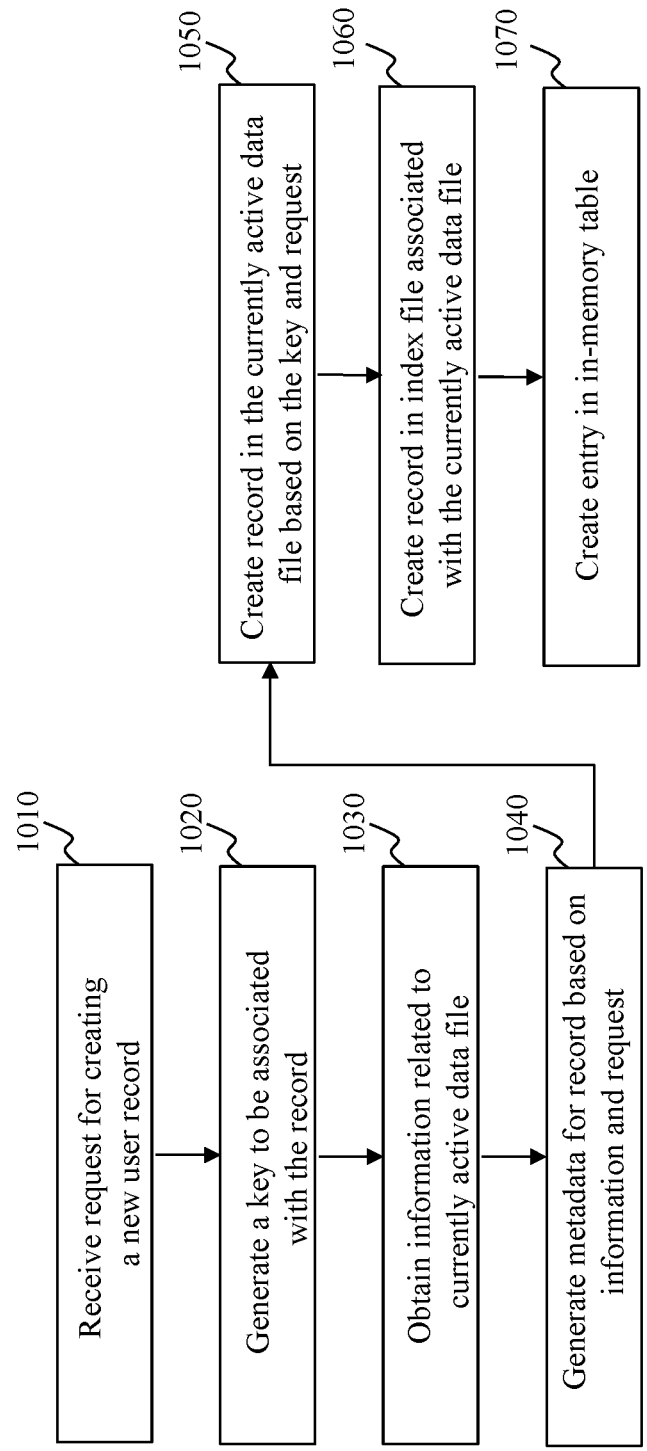
FIG. 10 is a flowchart of an exemplary process performed by a record creation unit, according to an embodiment of the present disclosure.

FIG. 10 is a flowchart of an exemplary process performed by a record creation unit, according to an embodiment of the present disclosure. The process commences in step 1010, wherein the record creating unit receives a request for creating a new user record. In step 1020, the record creating unit generates a key that is to be associated with the new record. Further, in step 1030, the record creating unit obtains information of the current active data file. For instance, according to one embodiment, the record creating unit may receive an identifier of the current active data file. Note that as stated previously, all write operations in the storage engine of the present disclosure are performed in a sequential manner. Accordingly, the obtained identifier corresponds to the data file where the new record is to be stored.

The process thereafter proceeds to step 1040, wherein the record creation unit generates metadata for the new record based on the information related to the current data file obtained in step 1030 and information related to the request. Further, in step 1050, the record creation unit creates a record in the current data file (i.e., currently active data file) based on the key and the request. Thereafter, the record creation unit, in step 1060, creates a corresponding record in the index file associated with the current data file, and creates a corresponding entry in the in-memory table in step 1070.

Figure 11:
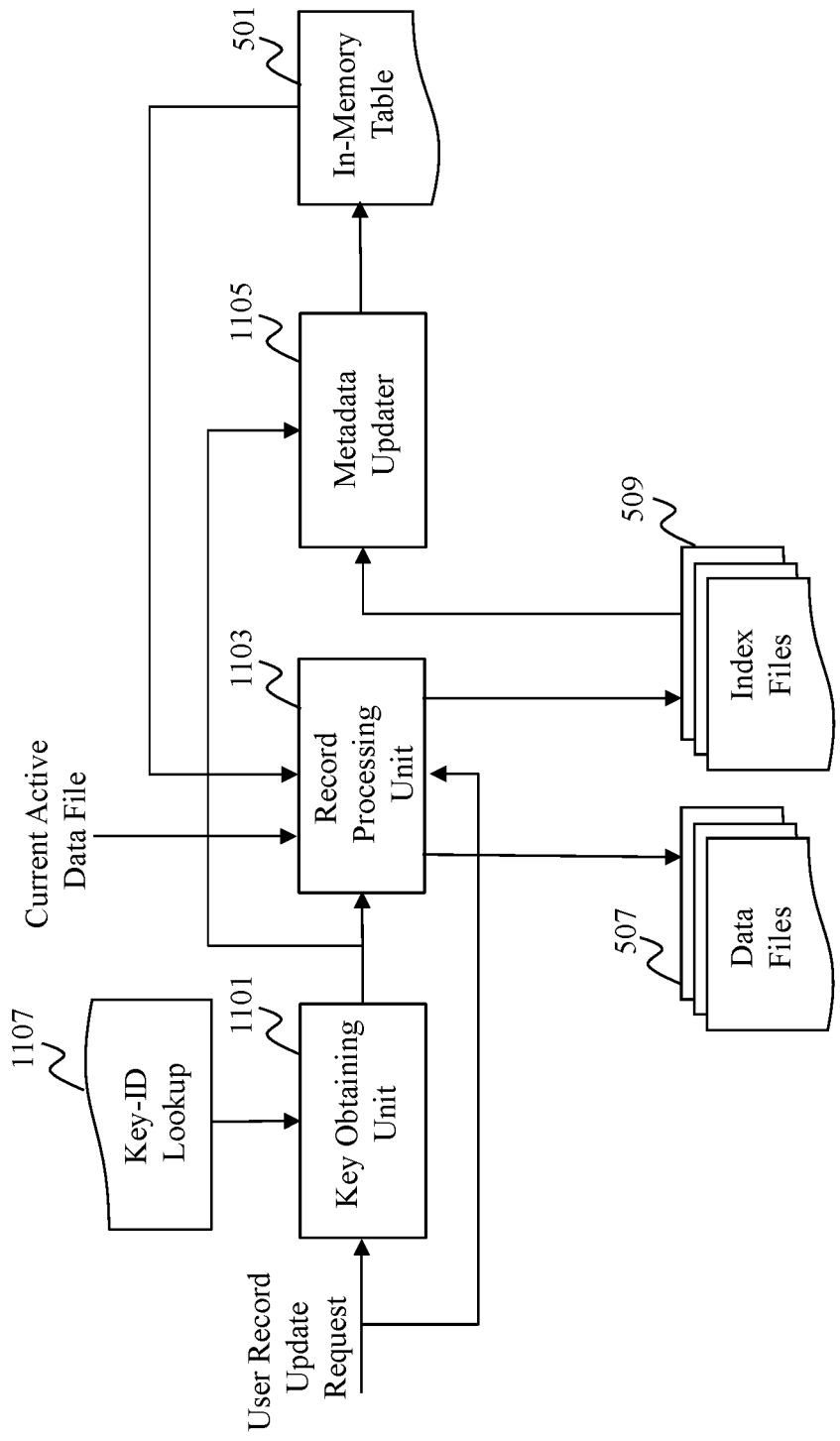
FIG. 11 depicts an exemplary system diagram of a record update unit, according to an embodiment of the present disclosure.

Turning to FIG. 11, there is provided an exemplary system diagram of a record update unit 405. According to an embodiment of the present disclosure, the record update unit 405 functions in a manner similar to the record creation unit 401 in that, for each record that is to be updated, the record update unit creates a new record which includes the updated content. However, different from the record creation unit, the record update unit 405 marks the previous record as an invalid or stale record.

The record update unit 405 includes a key obtaining unit 1101, a record processing unit 1103, and a metadata updater 1105. The key obtaining unit functions in a manner similar to the key retrieving unit 701 as shown in FIG. 7. Specifically, the key obtaining unit 1101 receives a request to update a certain user record. The information included in the request may contain for example, a user ID associated with the record that is to be updated, new/modified content that is to be associated with the user record, and the like. The key obtaining unit 1101 utilizes the key-ID lookup table 1107 to obtain a key associated with the user ID.

The record processing unit 1103 receives the obtained the key and the new/modified content. Based on the obtained key, the record processing unit 1103 extracts metadata associated with the key from the in-memory table 501. Further, based on the extracted metadata, the record processing unit 1103 identifies the data file that includes the user record (i.e., the old or unmodified user record). According to one embodiment, the record processing unit 1103 marks the user record in the data file as an invalid or stale user record. As each data file is associated with an index file, the record processing unit 1103 may also mark the entry in the index file associated with the key as an invalid or stale entry. Additionally, the record processing unit 1103 may update a stale count of the data file. By one embodiment of the present disclosure, each data file may be associated with a counter (referred to herein as a stale counter) that tracks a number of records in the data file that are invalid or stale. The stale counters for the data files may be maintained in a table which is stored in the memory portion 510 of the storage unit.

The record processing unit 1103 obtains an indicator of the current active data file. Based on the key and the new/modified content associated with the update request, the record processing unit 1103 creates a new record that is stored in the current active data file. It must be appreciated that the record processing unit 1103 may also include a metadata generator (similar to the one as depicted in the record creation unit of FIG. 9) that is configured to generate new metadata for the newly created record. Thus, the record processing unit 1103 may create an entry in the index file (associated with the current active data file) to include the key and the newly generated metadata.

The metadata updater 1105 is configured to retrieve, from the index file, the new metadata associated with the newly created record. Upon retrieving the new metadata, the metadata updater 1105 utilizes the obtained key (from the key obtaining unit 1101) to update the metadata associated with the key in the in-memory table 501. In this manner, the entry in the in-memory table 501 (corresponding to the key) is associated with the newly created record in the currently active data file.

Moreover, it must be appreciated that the storage engine according to the present disclosure does not overwrite a record in order to update the record. Rather, a new record including the updated content is created. Thus, in order to create free space, the storage engine according to the present disclosure implements a compaction job which removes or deletes stale data records. Such cleanup operations are performed by the compaction unit included in the storage engine. Details regarding the compaction unit are described below.

Figure 12:
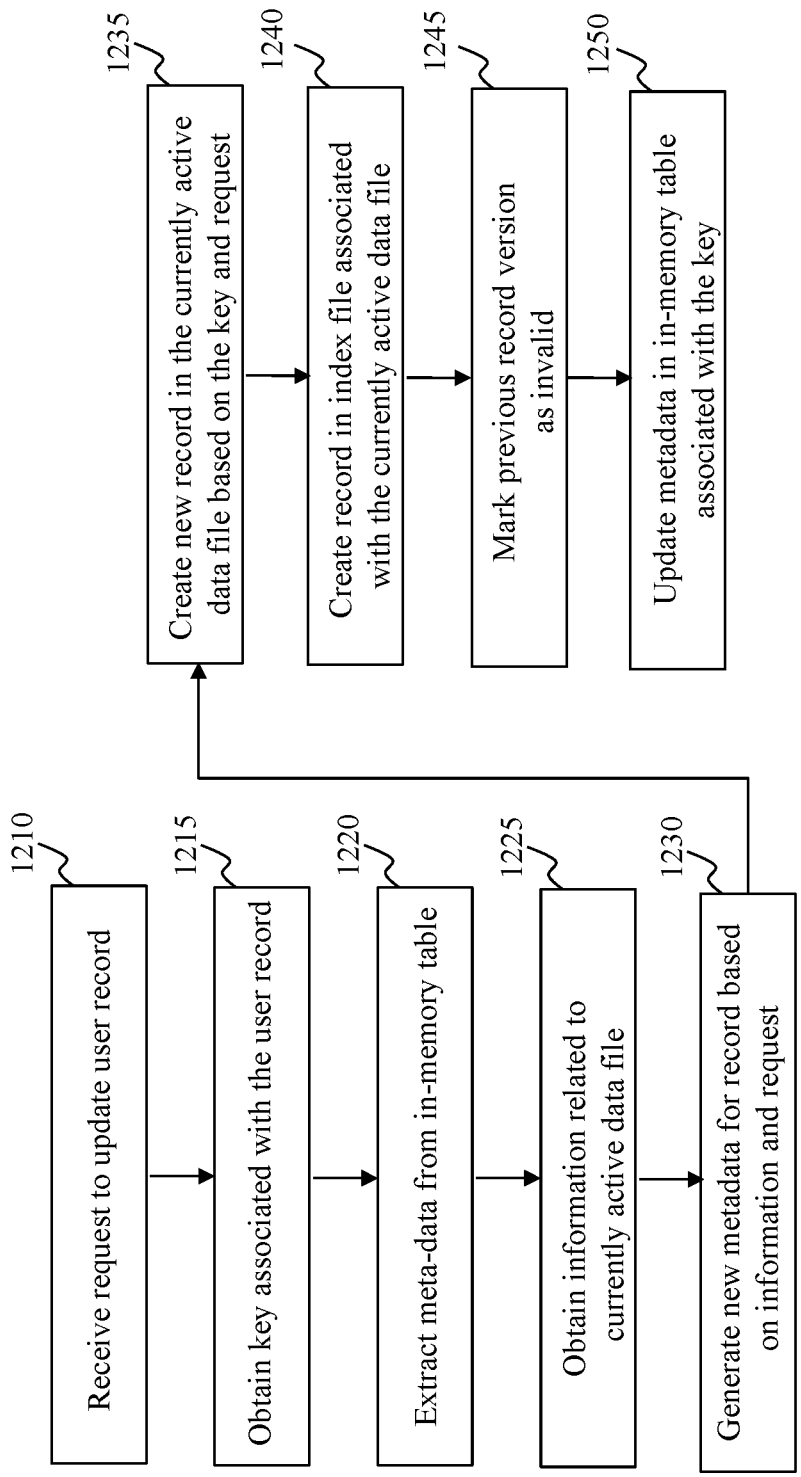
FIG. 12 is a flowchart of an exemplary process performed by a record update unit, according to an embodiment of the present disclosure.

FIG. 12 is a flowchart of an exemplary process performed by a record update unit, according to an embodiment of the present disclosure. The process commences in step 1210, wherein the record update unit receives a request to update a user record. In step 1215, the record update unit obtains a key associated with the user record. Further, in step 1220, the record update unit extracts metadata associated with the key from the in-memory table.

The process then moves to step 1225, wherein the record update unit obtains information related to a currently active data file. In step 1230, the record update unit generates new metadata that is to be associated with the updated record based on the obtained information and the request.

In step 1235, the record update unit creates a new record in the currently active data file based on the obtained key (step 1215) and the request. Further, in step 1240, the record update unit creates a record in the index file associated with the currently active data file. Thereafter, the record update unit in step 1245, marks the previous or old record (i.e., previously unmodified record) as an invalid record or a stale record. Additionally, the record update unit may also update the stale count of the data file. Further, the process moves to step 1250, wherein the record update unit updates metadata for the entry in the in-memory table associated with the obtained key. Thus, the entry in the in-memory table is associated with the newly created record in the currently active data file.

Figure 13:
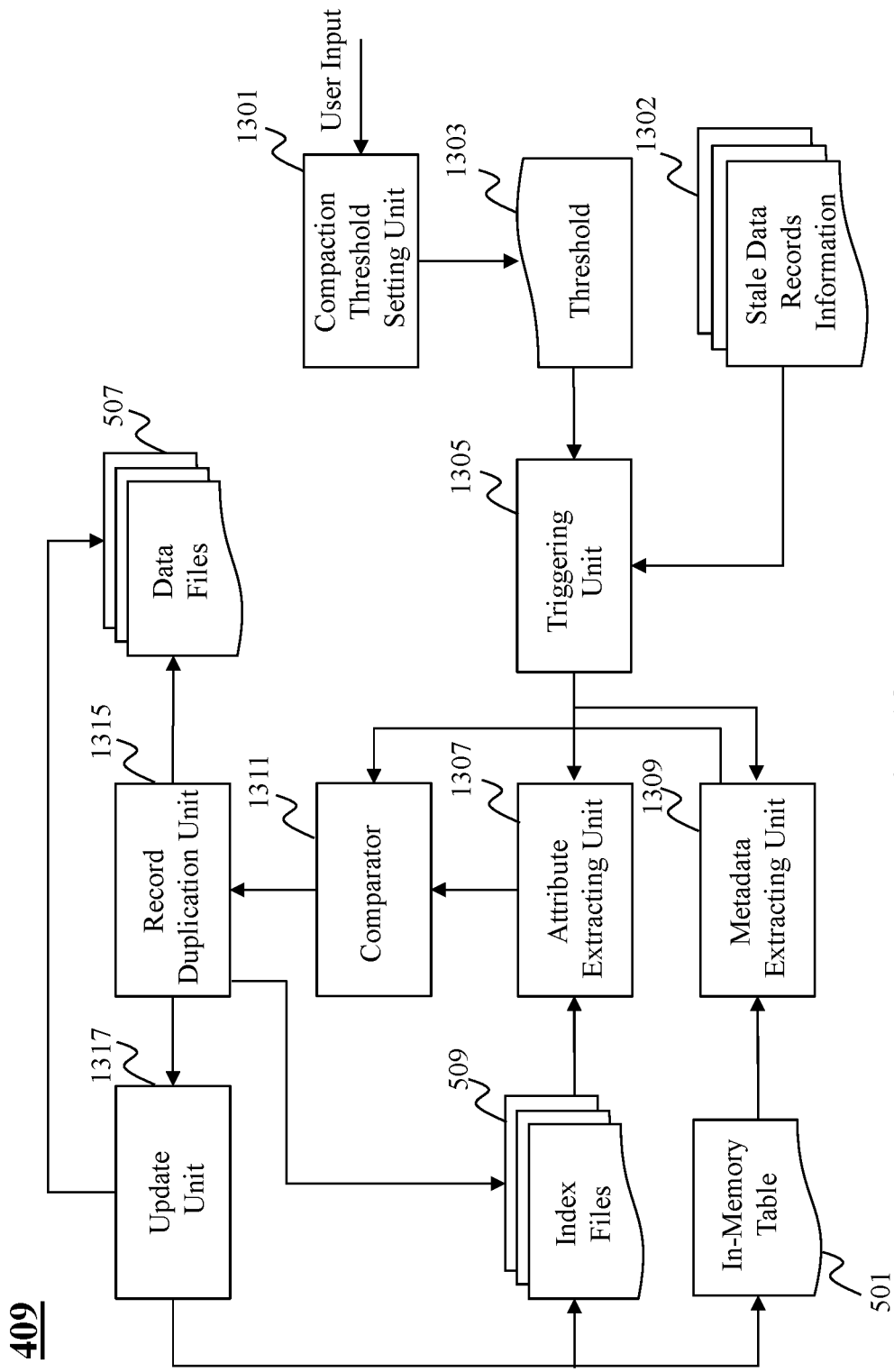
FIG. 13 depicts an exemplary system diagram of a compaction unit, according to an embodiment of the present disclosure.

Turning now to FIG. 13, there is depicted an exemplary system diagram of a compaction unit 409, according to an embodiment of the present disclosure. As stated previously, data files of the storage engine are immutable once they are rolled over. Updates to an existing record(s) are stored as a new version in a different location i.e., the currently active data file. Accordingly, without a way to cleanup older versions of data the size of the storage unit will increase with time.

According to one embodiment of the present disclosure, the compaction unit 409 is responsible for cleaning up stale or invalid data. The compaction unit 409 includes a compaction threshold setting unit 1301, a triggering unit 1305, an attribute extracting unit 1307, a metadata extracting unit 1309, a comparator 1311, a records duplication unit 1315, and an update unit 1317.

The compaction threshold setting unit 1301 receives user input pertaining to a compaction threshold 1303 that is to be assigned to the data files. According to one embodiment, the user configurable compaction threshold may be set to be the same for all the data files, or alternatively, the user may set unique compaction threshold values for each data file. As stated previously, each data file is associated with a stale counter, which tracks a number of records in the data file that are invalid or stale. The stale data records information (i.e., the stale counters) 1302 for the data files may be maintained in a table which is stored in the memory portion 510 (FIG. 5) of the storage unit.

The triggering unit 1305 checks if a stale counter associated with a data file violates the compaction threshold assigned to the data file. Specifically, the triggering unit 1305 determines whether a number of stale records in a data file (i.e., value of the stale counter associated with the data file) exceeds the compaction threshold associated with the data file. If the triggering unit 1305 determines affirmatively that the compaction threshold associated with a data file has been exceeded, the triggering unit 1305 initiates a compaction process (i.e., a clean up process) as described below.

According to one embodiment of the present disclosure, instead of scanning the data file to find records to be copied, the compaction unit 409 scans the index file (associated with the data file) as it is smaller in size as compared to the data file. Specifically, the triggering unit 1305 activates the attribute extracting unit 1307 to scan the index file 509 corresponding to the data file. The attribute extracting unit 1307 extracts first metadata (e.g., key, sequence number, etc., as shown in FIG. 6B) from a record stored in the index file. The extracted first metadata is transmitted to the comparator 1311.

In a similar manner, the triggering unit 1305 activates the metadata extracting unit 1309 to extract second metadata associated with the key from the in-memory table. The extracted second metadata is transmitted to the comparator 1311. The comparator 1311 is configured to compare the first metadata obtained from the index file with the second metadata obtained from the in-memory table. For example, the comparator 1311 may determine whether the sequence numbers extracted respectively, from the index file and the in-memory table, match one another.

The comparator 1311 affirmatively determines that the record under consideration is a fresh record (i.e. not an invalid or stale record) based on a match between the extracted first and second metadata. In response to determining a match, the comparator 1311 triggers the record duplication unit 1315 to make a new copy of the record in the data file 507 that is currently active. Moreover, the record duplication unit 1315 may also be configured to create a new entry (corresponding to the new record created in the currently active data file) in the index file that corresponds to the currently active data file.

According to one embodiment of the present disclosure, upon creating a copy of the valid record of the data file in the currently active data file, the record duplication unit 1315 activates the update unit 1317. The update unit 1317 is configured to automatically update the record entry in the in-memory table (corresponding to the key of the newly copied record) with metadata of the record. In this manner, the entry in the in-memory table 501 is associated with the newly created record in the currently active data file. Further, according to one embodiment of the present disclosure, upon completion of the compaction process of the data file i.e., creating copies of all valid records of the data file in the currently active data file, the update unit 1317 may also be configured to delete the old data file and index file.

Figure 14:
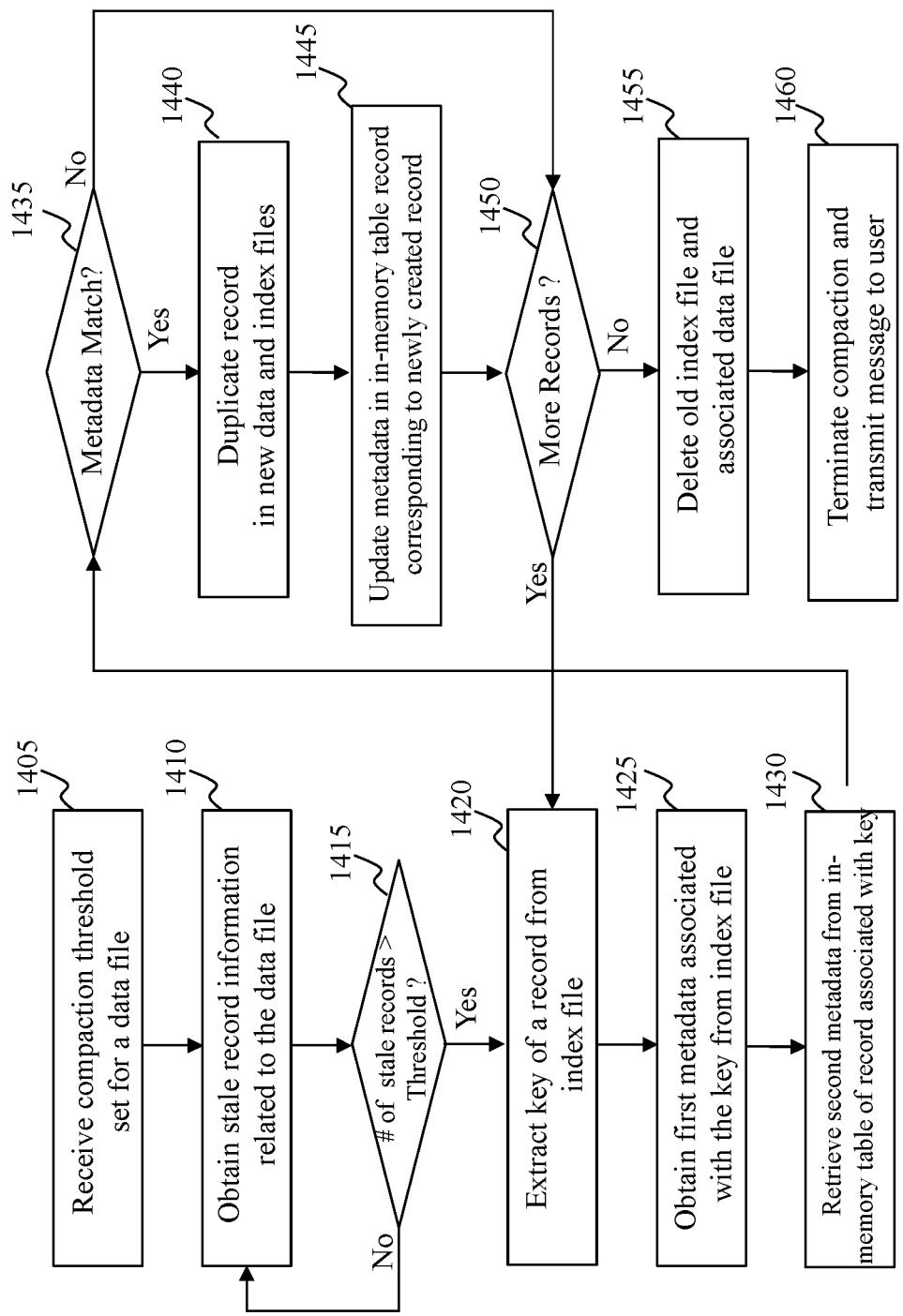
FIG. 14 is a flowchart of an exemplary process performed by a compaction unit, according to an embodiment of the present disclosure.

FIG. 14 is a flowchart of an exemplary process performed by a compaction unit, according to an embodiment of the present disclosure. The process commences in step 1405 wherein the compaction unit receives a compaction threshold set for a data file. In step 1410, stale record information associated with the data file is obtained.

In step 1415, the compaction unit performs a query to determine whether the compaction threshold associated with the data file is violated. Specifically, the compaction unit determines whether a number of stale records in the data file is greater than the compaction threshold. If the response to the query is affirmative, the process moves to step 1420, else the process loops back to step 1410.

In step 1420, the compaction unit extracts a key of a record from the index file (associated with the data file whose compaction threshold is violated). The process then moves to step 1425, wherein the compaction unit obtains first metadata associated with the key from the index file.

Thereafter, in step 1430, the compaction unit retrieves, from the in-memory table, second metadata of a record associated with the key. In step 1435, the compaction unit performs a query to determine whether the first metadata matches the second metadata. If the response to the query is affirmative (i.e., the record is not a stale record) the process moves to step 1440. However, if the response to the query is negative (i.e., the record is a stale record), then the process moves to step 1450.

In step 1440, the compaction unit creates a fresh copy of the valid record (i.e. creates a duplicate record) and stores the fresh copy in the currently active data file. Additionally, the compaction unit also updates the index file associated with the currently active data file to reflect the newly added record in the currently actively data file. Thereafter, in step 1445, the compaction unit updates metadata of the entry in the in-memory table corresponding to the key, such that the entry in the in-memory table is associated with the newly created record in the currently active data file.

The process then moves to step 1450, wherein the compaction unit performs a query to determine if additional records exists in the data file. If the response to the query is affirmative, the process loops back to step 1420 to repeat the compaction process. However, if the response to the query is negative, the process moves to step 1455, wherein the old data file and index file (i.e., the data file and corresponding index file that were compacted) are deleted. Upon deletion of the old data and index files, the compaction process terminates and the compaction unit may transmit a message indicating completion of the compaction process to a user as shown in step 1460.

According to one embodiment of the present disclosure, the storage engine provides tunable (i.e., configurable) write amplification factor and space amplification factor. Moreover, the storage engine according to the present disclosure achieves a read amplification factor of one. Read amplification is defined as the number of requests that the storage engine makes to the disk for each query. During a read request, the metadata indicating the location of a record is read from the in-memory table. Thus, the storage engine needs to perform only a single lookup from the persistent layer (i.e., portion 550 of the storage unit), thereby achieving a read amplification factor of one.

According to one embodiment of the present disclosure, write amplification is defined as a ratio of size of data written to the disk to the size written to the storage engine. In the storage engine described herein, write amplification can be tuned by controlling the percentage of stale data at which a file is compacted i.e., the compaction threshold. Specifically, if x is the compaction threshold, then the write amplification is 100/x. For example, if compaction threshold is set to 50%, and if we write 100 MB/second to the storage engine, then the storage engine will write 100*100/50=200 MB/second to disk.

According to another embodiment of the present disclosure, space amplification is defined as ratio of the size of the database on disk to the size of data. As stated previously, referring to FIGS. 6A and 6B, each record requires a 17-byte header in the data file and 21 bytes of metadata in the index file. Thus, a record that has an 8-byte key writes an additional 46 bytes of data (i.e., 17 bytes header, 21 bytes metadata, and 8-byte key) to the disk, which negligibly affects the write amplification of the storage unit. It must be appreciated that the space amplification is also caused due to a fact that the storage engine according to the present disclosure maintains older version(s) of a record in the database until they are removed by the compaction process. Accordingly, decreasing the compaction threshold will clear the stale records faster, thus reducing space amplification, whereas increasing the threshold would increase the storage size.

Thus, by tuning the write and space amplification factors via setting the compaction threshold, the storage engine of the present disclosure provides for a tradeoff between write amplification and space amplification. Accordingly, one can tune the storage engine based on different workloads, desired write throughput, desired storage utilization, and bandwidth of the storage device.

Figure 15:
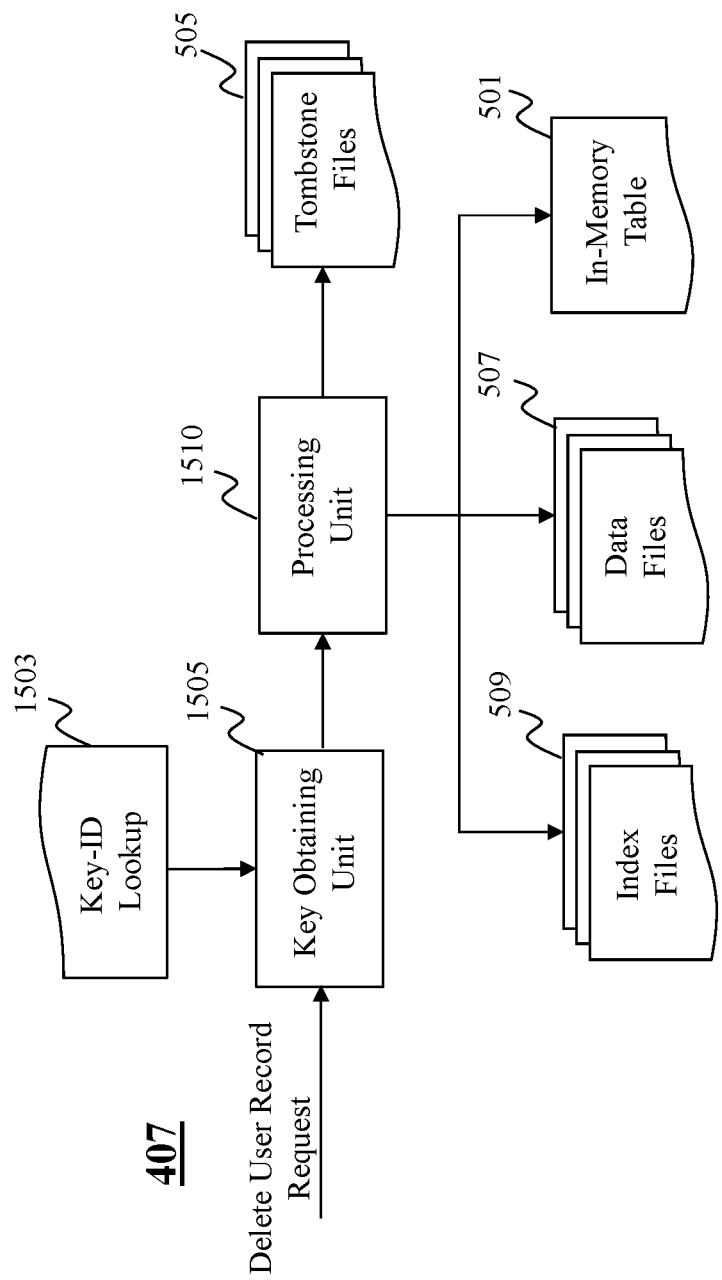
FIG. 15 depicts an exemplary system diagram of a record deleting unit, according to an embodiment of the present disclosure.

FIG. 15 depicts an exemplary system diagram of a record deleting unit 407 according to an embodiment of the present disclosure. Upon the storage engine receiving a request for deleting a user record, the record deleting unit 407 creates an entry in the tombstone files with the key associated with the record. Note that as shown in FIG. 5, the tombstone files 505 are distinct (i.e., maintained separately) from the data files. This provides the storage engine of the present disclosure a unique advantage in that the tombstone record once written does not need to be copied again during compaction. This enhances the write amplification of the storage engine, as unnecessary read and write operations are avoided by maintaining the tombstone files separate from the data files.

The record deleting unit 407 includes a key obtaining unit 1505 and a processing unit 1510. The key obtaining unit 1505 upon receiving a request for deleting a particular user record, obtains the key associated with the user record by utilizing a key-ID look up table 1503. The obtained key is transmitted to the processing unit 1510.

The processing unit 1510 creates a record in the tombstone files 505 based on the obtained key. Furthermore, the processing unit 1510 marks all previous versions of the record associated with the user in the data files 507 and or index files 509 as invalid. Thereafter, the processing unit 1510 deletes, from the in-memory table 501, the corresponding entry associated with the key of the user record. Moreover, upon deleting the previous versions of the record(s) from the data file, the processing unit 1510 may be configured to update the stale record information associated with the data file(s).

Figure 16:
FIG. 16 is a flowchart of an exemplary process performed by a record deleting unit, according to an embodiment of the present disclosure.

FIG. 16 is a flowchart of an exemplary process performed by a record deleting unit, according to an embodiment of the present disclosure. The process commences in step 1610, wherein the deletion unit receives a request to delete a user record. In step 1620, the deletion unit utilizes a key-ID lookup table to determine a key associated with the user record.

The process then moves to step 1630, wherein a query is performed to check if the key is present in the look-up table. If the response to the query is negative, the process moves to step 1640, wherein the record deletion process is terminated. However, if the response to the query in step 1630 is affirmative (i.e., key present), the process moves to step 1650.

In step 1650, the deletion unit creates a record (i.e., an entry) in the tombstone file based on the key. The process then moves to step 1660, wherein the deletion unit marks all previous versions of the record under consideration as invalid in the data files and/or the index files. In step 1670, the deletion unit deletes the record in the in-memory table associated with key. Further, the process in step 1680, updates the stale record information of the data files. Specifically, the stale counter associated with each data file is updated based on the number of previous versions of the record(s) that are marked as invalid.

According to one embodiment of the present disclosure, the storage engine driver 410 as depicted in FIG. 4 includes a management and recovery unit 411. The management and recovery unit 411 is configured to manage and provide durability for the storage unit 420 and enable efficient recovery from crash scenarios e.g., power loss scenarios. Write-ahead-logs (WAL) are usually used by databases for crash recovery. In the storage engine of the present disclosure, the data files stored in the disk portion 550 of the storage unit (as shown in FIG. 5) are essentially WALs. Therefore, crash recovery is easier and faster as described below.

According to one embodiment of the present disclosure, the storage engine driver does not flush write operations to disk immediately. Rather, for performance reasons, the write operations are performed in an operating system's page cache. The cache may be synced to the disk once a configurable size is reached. In the event of a power loss, the data that is not flushed to disk will be lost. Such a compromise between performance and durability is a necessary one.

In the event of a power loss and/or data corruption, the storage engine driver according to the present disclosure scans and discards the corrupted records. Note that as stated previously, the data files are immutable once they are rolled over. Since a write operation and a compaction operation could be operating on at most two files at a time, only those files need to be repaired. Thus, the recovery times are very short. Furthermore, the metadata for each record may include a CRC 32 checksum. Accordingly, during crash recovery, the last written data files may be scanned and those records without a matching checksum may be discarded. It must be appreciated that the index files for the repaired data file may also be recreated. Thus, the storage engine of the present disclosure provides for the following consistency guarantees in the event of a power loss: (a) atomic writes, (b) inserts and updates are committed to disk in the same order they are received, and (c) in the event that the insert/update and/or the delete operations are interleaved amongst one another, at least partial ordering can be guaranteed.

Figure 17:
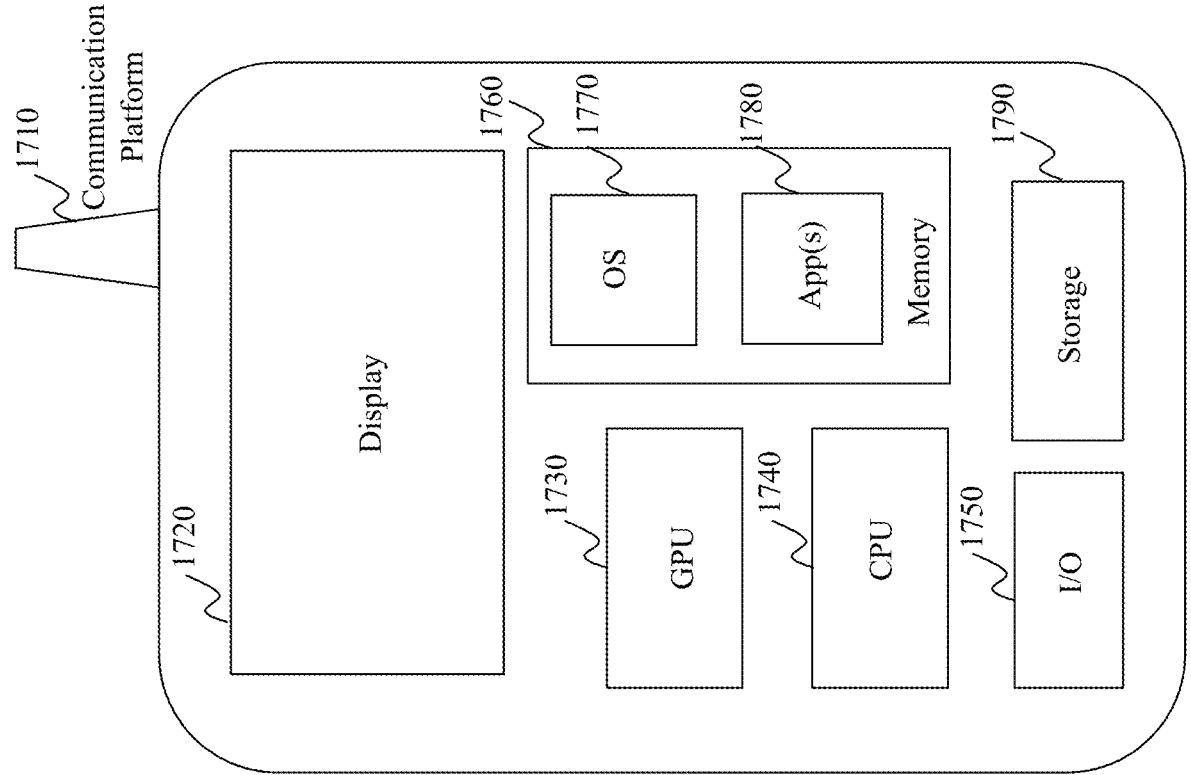
FIG. 17 depicts an architecture of a mobile device which can be used to implement a specialized system incorporating the present disclosure.

Turning now to FIG. 17, there is depicted an architecture of a mobile device 1700, which can be used to realize a specialized system implementing the present invention. In this example, a user device on which the functionalities of the various embodiments described herein can be implemented is a mobile device 1700, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1700 in this example includes one or more central processing units (CPUs) 1740, one or more graphic processing units (GPUs) 1730, a display 1720, a memory 1760, a communication platform 1710, such as a wireless communication module, storage 1790, and one or more input/output (I/O) devices 1750. Any other suitable component, including but not limited to a system bus or a controller (not shown), may also be included in the mobile device 1700. As shown in FIG. 17, a mobile operating system 1770, e.g., iOS®, Android®, Windows® Phone, etc., and one or more applications 1780 may be loaded into the memory 1760 from the storage 1790 in order to be executed by the CPU 1740. The applications 1780 may include a browser or any other suitable mobile apps for performing the various functionalities on the mobile device 1700. User interactions with the content displayed on the display panel 1720 may be achieved via the I/O devices 1750.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those of ordinary skill in the art are adequately familiar therewith to adapt those technologies. A computer with user interface elements may be used to implement a personal computer (PC) or other type of work station or terminal device, although a computer may also act as a server if appropriately programmed. It is believed that those of ordinary skill in the art are familiar with the structure, programming, and general operation of such computer equipment and as a result the drawings should be self-explanatory.

Figure 18:
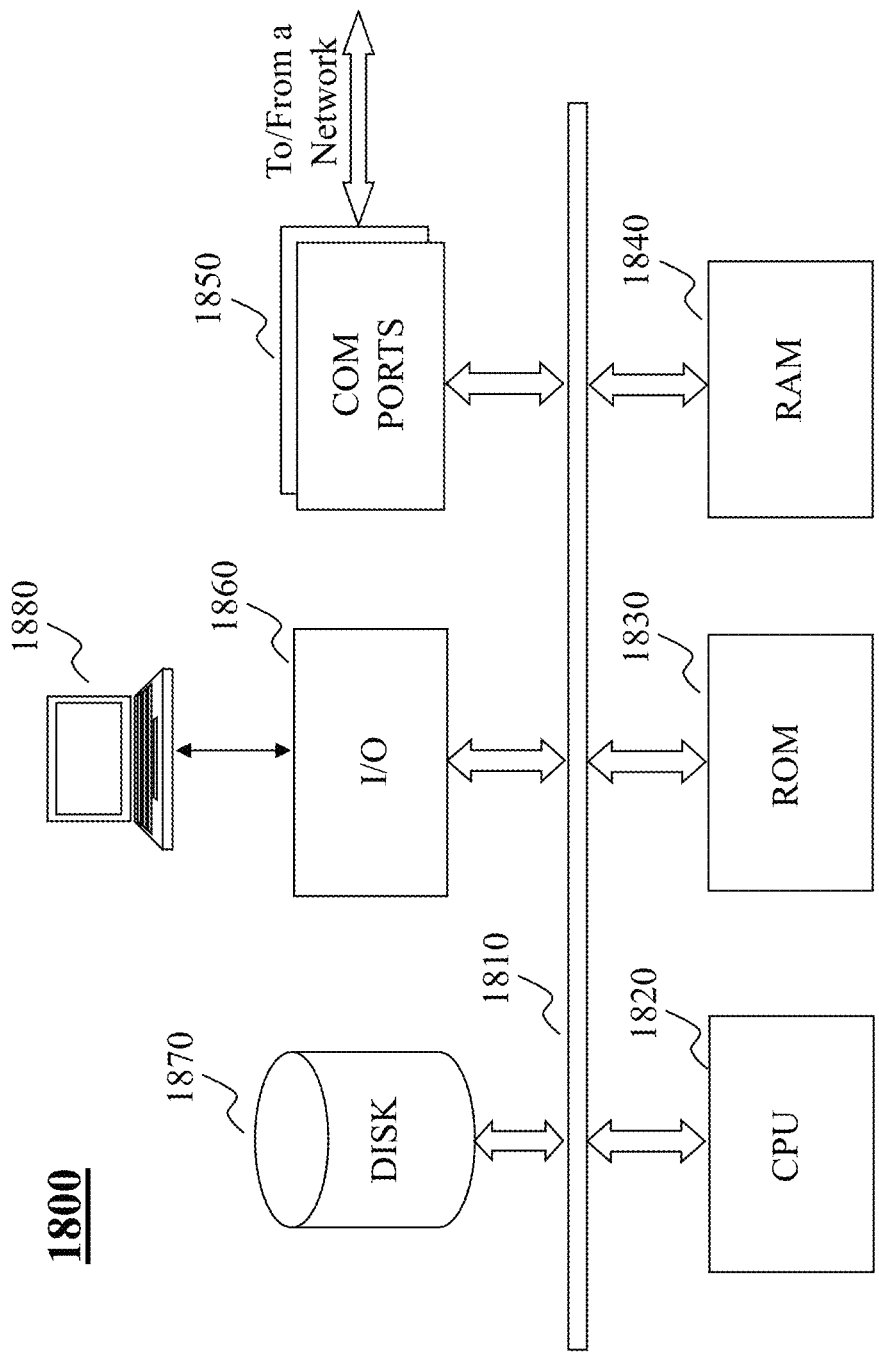
FIG. 18 depicts the architecture of a computer which can be used to implement a specialized system incorporating the present disclosure.

FIG. 18 is an illustrative diagram of an exemplary computer system architecture, in accordance with various embodiments of the present disclosure. Such a specialized system according to the present disclosure has a functional block diagram illustration of a hardware platform which includes user interface elements. Computer 1800 may be a general-purpose computer or a special purpose computer. Both can be used to implement a specialized system according to the present disclosure. Computer 1800 may be used to implement any component(s) described herein. For example, the present invention may be implemented on a computer such as computer 1800 via its hardware, software program, firmware, or a combination thereof. Although only one such computer is shown, for convenience, the computer functions relating to the present disclosure as described herein may be implemented in a distributed fashion on a number of similar platforms, to distribute the processing load.

Computer 1800, for example, may include communication (COM) ports 1850 connected to a network to facilitate data communications. Computer 1800 also includes a central processing unit (CPU) 1820, in the form of one or more processors, for executing program instructions. The exemplary computer platform may also include an internal communication bus 1810, program storage and data storage of different forms (e.g., disk 1870, read only memory (ROM) 1830, or random-access memory (RAM) 1840), for various data files to be processed and/or communicated by computer 1800, as well as possibly program instructions to be executed by CPU 1820. Computer 1800 may also include an I/O component 1860 supporting input/output flows between the computer and other components therein such as user interface elements 1880. Computer 1800 may also receive programming and data via network communications.

Hence, aspects of the present disclosure as outlined above, may be embodied in non-transitory computer readable medium storing executable program data. Program aspects of the technology may be thought of as "products" or "articles of manufacture" storing or carrying information which is typically in the form of executable code and/or associated data. Tangible non-transitory "storage" type media include any or all of the memory or other storage for the computers, processors or the like, or associated modules thereof, such as various semiconductor memories, tape drives, disk drives and the like, which may provide storage at any time for the non-transitory computer readable medium storing executable program data.

All or portions of the software may at times be communicated through a network such as the Internet or various other telecommunication networks. Such communications, for example, may enable loading of the software from one computer or processor into another, for example, from a management server or host computer of the storage engine into the hardware platform(s) of a computing environment or other system implementing a computing environment or similar functionalities in connection with the storage engine. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium storing executable program data" refer to any medium that participates in providing instructions to a processor for execution.

Hence, a machine-readable medium storing executable program data may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a compact disc-read only memory (CD-ROM), a digital versatile disk (DVD) or a digital versatile disk-read only memory (DVD-ROM), any other optical medium, punch cards paper tape, any other physical storage medium with patterns of holes, a random access memory (RAM), a programmable read only memory (PROM) and an erasable programmable read only memory (EPROM), a flash EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those of ordinary skill in the art will recognize that the present invention is amenable to a variety of modifications and/or enhancements. For example, although the implementation of various components described above may be embodied in a hardware device, the various components may also be implemented as a software only solution—e.g., an installation on an existing server. In addition, the storage engine, as disclosed herein, may be implemented as a firmware, firmware/software combination, firmware/hardware combination, or a hardware/firmware/software combination.

While the foregoing has described what are considered to constitute the present embodiments and/or other examples, it is understood that various modifications may be made thereto and that the subject matter disclosed herein may be implemented in various forms and examples, and that the teachings of the present disclosure may be applied in numerous applications, only some of which have been described herein. It is intended by the following claims to claim any and all applications, modifications and variations that fall within the true scope of the present invention.

I claim:

1. A method, implemented on a machine having at least one processor, storage, and a communication platform capable of connecting to a network for operating a storage engine, the method comprising:
   obtaining a compaction value associated with a data file, wherein the compaction value indicates the minimum number of records in the data file that are invalid to trigger a clean-up process of the data file, the data file is associated with an index file, which includes information with respect to each corresponding record included in the data file;
   retrieving a counter corresponding to the data file; and
   in response to the counter satisfying a first criterion,
      determining, for each record included in the data file, whether the record is to be written to another data file based on determining whether the record is a fresh record, wherein a write amplification factor of the storage engine is determined based on the compaction value.

2. The method of claim 1, wherein the counter indicates the number of records in the data file that are invalid.

3. The method of claim 1, wherein the first criterion corresponds to the counter being greater than the compaction value.

4. The method of claim 1, wherein the data file and the index file are stored in a first portion of a storage unit included in the storage engine, and wherein the index file includes a key and first metadata corresponding to each record included in the data file.

5. The method of claim 4, wherein the storage unit includes an in-memory table stored in a second portion of the storage unit, the in-memory table including a key and second metadata corresponding to each record included in the data file, and wherein the second portion of the storage unit is separate from the first portion.

6. The method of claim 5, wherein the determining comprises:
   for each record included in the data file,
      extracting, from the index file, a key corresponding to the record,
      obtaining the first metadata corresponding to the record from the index file, and
      obtaining, based on the extracted key, the second metadata corresponding to the record from the in-memory table, and wherein the determining whether the record is a fresh record corresponds to determining whether the first metadata matches the second metadata.

7. The method of claim 1, wherein a space amplification factor of the storage engine is determined based on the compaction value, and wherein the write amplification factor of the storage engine is inversely proportional to the compaction value, and the space amplification factor of the storage engine is directly proportional to the compaction value.

8. The method of claim 1, further comprising:
receiving a request to delete a record from the data file;
obtaining a key associated with the record requested to be deleted;
creating a new record based on the obtained key, the new record being stored in a file separate from the data file; and
marking the record requested to be deleted from the data file as an invalid record.

9. A non-transitory computer readable medium including computer executable instructions, wherein the instructions, when executed by a processor of a computer, cause the processor of the computer to perform a method for operating a storage engine, the method comprising:
obtaining a compaction value associated with a data file, wherein the compaction value indicates the minimum number of records in the data file that are invalid to trigger a clean-up process of the data file, the data file is associated with an index file, which includes information with respect to each corresponding record included in the data file;
retrieving a counter corresponding to the data file; and
in response to the counter satisfying a first criterion,
determining, for each record included in the data file, whether the record is to be written to another data file based on determining whether the record is a fresh record, wherein a write amplification factor of the storage engine is determined based on the compaction value.

10. The non-transitory computer readable medium of claim 9, wherein the counter indicates the number of records in the data file that are invalid.

11. The non-transitory computer readable medium of claim 9, wherein the first criterion corresponds to the counter being greater than the compaction value.

12. The non-transitory computer readable medium of claim 9, wherein the data file and the index file are stored in a first portion of a storage unit included in the storage engine, and wherein the index file includes a key and first metadata corresponding to each record included in the data file.

13. The non-transitory computer readable medium of claim 12, wherein the storage unit includes an in-memory table stored in a second portion of the storage unit, the in-memory table including a key and second metadata corresponding to each record included in the data file, and wherein the second portion of the storage unit is separate from the first portion.

14. The non-transitory computer readable medium of claim 13, wherein the determining comprises:
for each record in the data file,
extracting, from the index file, a key corresponding to the record,
obtaining the first metadata corresponding to the record from the index file, and
obtaining, based on the extracted key, the second metadata corresponding to the record from the in-memory table, and wherein the determining whether the record is a fresh record corresponds to determining whether the first metadata matches the second metadata.

15. The non-transitory computer readable medium of claim 9, wherein a space amplification factor of the storage engine is determined based on the compaction value, and wherein the write amplification factor of the storage engine is inversely proportional to the compaction value, and the space amplification factor of the storage engine is directly proportional to the compaction value.

16. The non-transitory computer readable medium of claim 9, further comprising:
receiving a request to delete a record from the data file;
obtaining a key associated with the record requested to be deleted;
creating a new record based on the obtained key, the new record being stored in a file separate from the data file; and
marking the record requested to be deleted from the data file as an invalid record.

17. A system having a processor, storage, and a communication platform capable of connecting to a network for operating a storage engine, the system comprising:
a compaction unit implemented by the processor and configured to
obtain a compaction value associated with a data file, wherein the compaction value indicates the minimum number of records in the data file that are invalid to trigger a clean-up process of the data file, the data file is associated with an index file, which includes information with respect to each corresponding record included in the data file;
retrieve a counter corresponding to the data file; and
in response to the counter satisfying a first criterion,
determine, for each record included in the data file, whether the record is to be written to another data file based on determining whether the record is a fresh record, wherein a write amplification factor of the storage engine is determined based on the compaction value.

18. The system of claim 17, wherein the counter indicates the number of records in the data file that are invalid.

19. The system of claim 17, wherein the first criterion corresponds to the counter being greater than the compaction value.

20. The system of claim 17, wherein the data file and the index file are stored in a first portion of a storage unit included in the storage engine, and wherein the index file includes a key and first metadata corresponding to each record included in the data file.

* * * * *